(12) United States Patent
Grigg

(10) Patent No.: US 10,633,120 B2
(45) Date of Patent: Apr. 28, 2020

(54) AIR AND SPACE CRAFT WITH INDEPENDENTLY ORIENTED THRUST GENERATORS

(71) Applicant: Charles Grigg, Westport, CA (US)

(72) Inventor: Charles Grigg, Westport, CA (US)

(73) Assignee: Charles Grigg, Westport, CA (US)

( * ) Notice: Subject to any disclaimer, the term of this patent is extended or adjusted under 35 U.S.C. 154(b) by 578 days.

(21) Appl. No.: 15/637,922

(22) Filed: Jun. 29, 2017

(65) Prior Publication Data

US 2018/0222603 A1 Aug. 9, 2018

Related U.S. Application Data

(60) Provisional application No. 62/602,808, filed on May 8, 2017, provisional application No. 62/601,821, filed on Apr. 3, 2017, provisional application No. 62/601,356, filed on Mar. 20, 2017, provisional application No. 62/499,759, filed on Feb. 6, 2017.

(51) Int. Cl.
| | |
|---|---|
| *B64C 39/00* | (2006.01) |
| *B64D 27/20* | (2006.01) |
| *B64G 1/14* | (2006.01) |
| *B64C 15/02* | (2006.01) |
| *B64D 27/02* | (2006.01) |
| *B64G 1/40* | (2006.01) |

(52) U.S. Cl.
CPC .............. *B64G 1/14* (2013.01); *B64C 15/02* (2013.01); *B64C 39/001* (2013.01); *B64D 27/023* (2013.01); *B64D 27/20* (2013.01); *B64G 1/403* (2013.01); *B64D 2027/026* (2013.01); *B64G 1/40* (2013.01)

(58) Field of Classification Search
CPC .............................. B64C 39/001; B64D 27/20
See application file for complete search history.

(56) References Cited

U.S. PATENT DOCUMENTS

| | | | | |
|---|---|---|---|---|
| 3,199,809 A | * | 8/1965 | Modesti | B64C 29/0066 244/12.2 |
| 3,503,573 A | | 3/1970 | Modesti | |
| 3,752,419 A | * | 8/1973 | Richter | B64C 39/001 244/23 C |
| 4,214,720 A | * | 7/1980 | DeSautel | B64C 39/001 244/12.2 |

(Continued)

FOREIGN PATENT DOCUMENTS

WO WO-2017105266 A1 * 6/2017 ........... B64C 39/001

OTHER PUBLICATIONS

International Search Report and Written Opinion, dated May 29, 2018 in PCT Application No. PCT/US18/16004, 13 pages.

(Continued)

*Primary Examiner* — Brian M O'Hara
(74) *Attorney, Agent, or Firm* — Vierra Magen Marcus LLP

(57) ABSTRACT

An aircraft includes a fuselage having an upper surface and a lower surface and a plurality of planetary modules housed in the fuselage, an individual planetary module having a first jet engine directed outward of the upper surface of the fuselage and a second jet engine directed outward of the lower surface of the fuselage, the individual planetary module rotatable within the fuselage about a vertical axis.

19 Claims, 23 Drawing Sheets

(56) References Cited

U.S. PATENT DOCUMENTS

| | | | |
|---|---|---|---|
| 4,461,436 A | 7/1984 | Messina | |
| 4,566,699 A * | 1/1986 | Cucuzza | B64C 39/001 |
| | | | 244/12.2 |
| 5,170,963 A | 12/1992 | Beck, Jr. | |
| 5,881,970 A | 3/1999 | Whitesides | |
| 9,550,566 B2 * | 1/2017 | Henning, Jr. | B64C 39/06 |

OTHER PUBLICATIONS

International Preliminary Report and Written Opinion, dated Aug. 6, 2019 in PCT Application No. PCT/US18/16004, 8 pages.

* cited by examiner

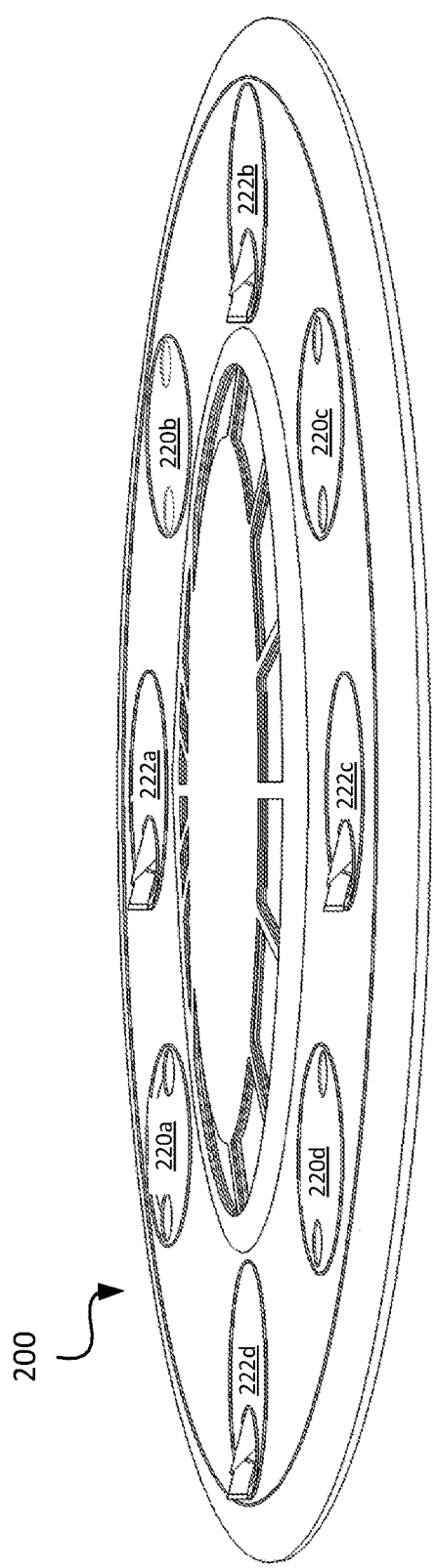
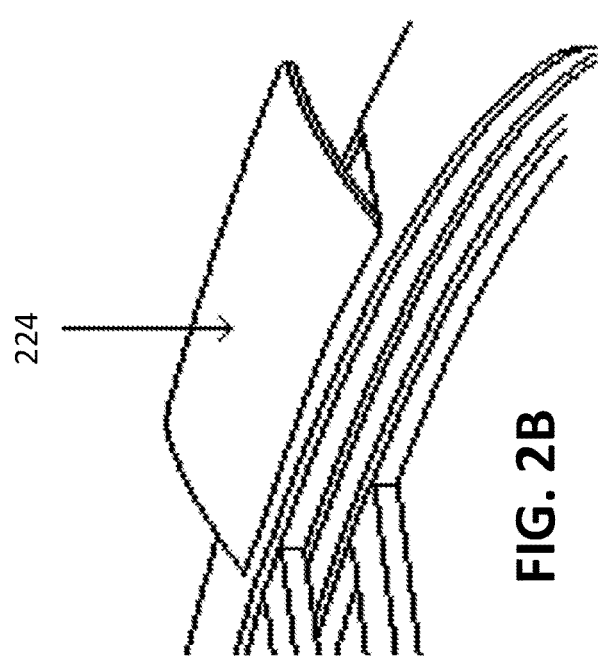
FIG. 2A
FIG. 2B

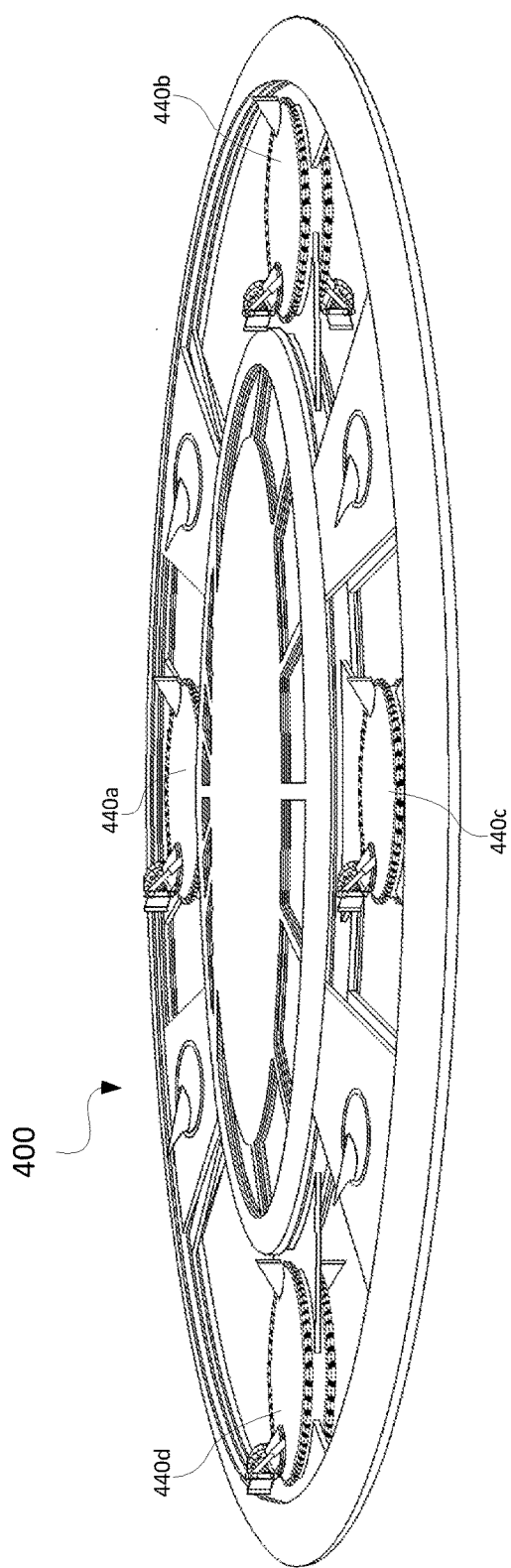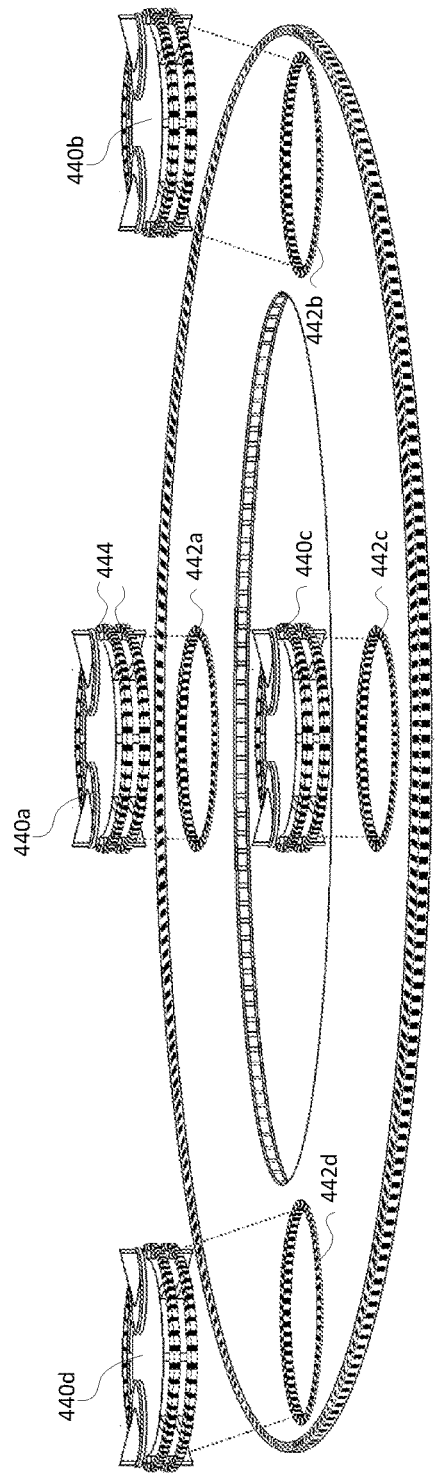
FIG. 4A
FIG. 4B

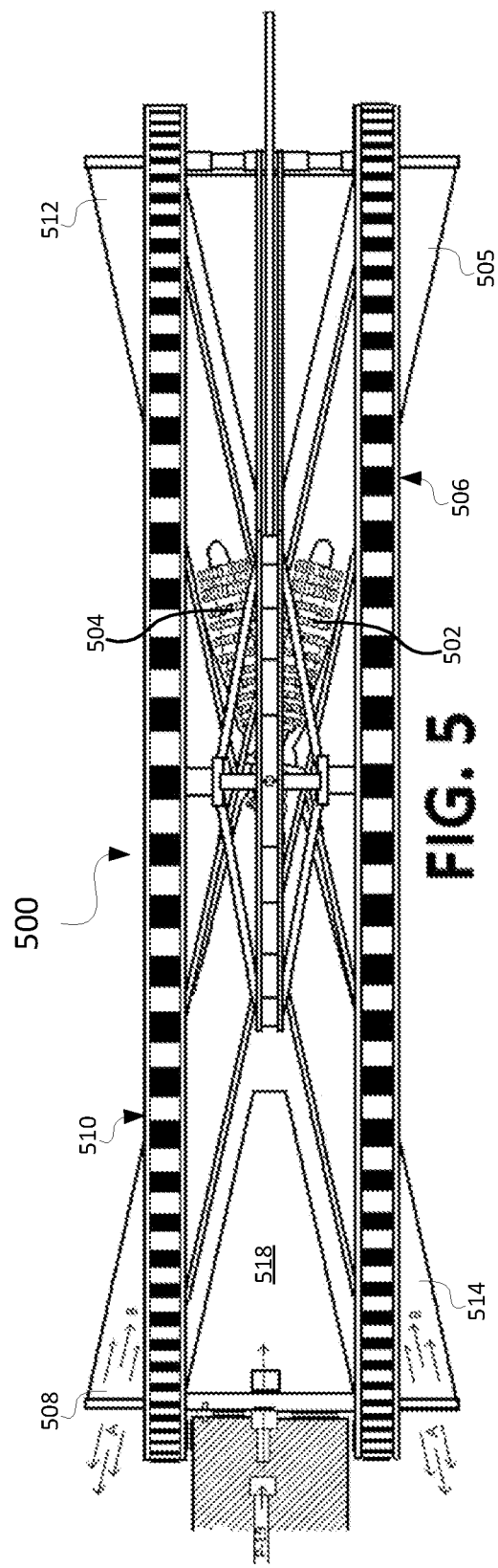
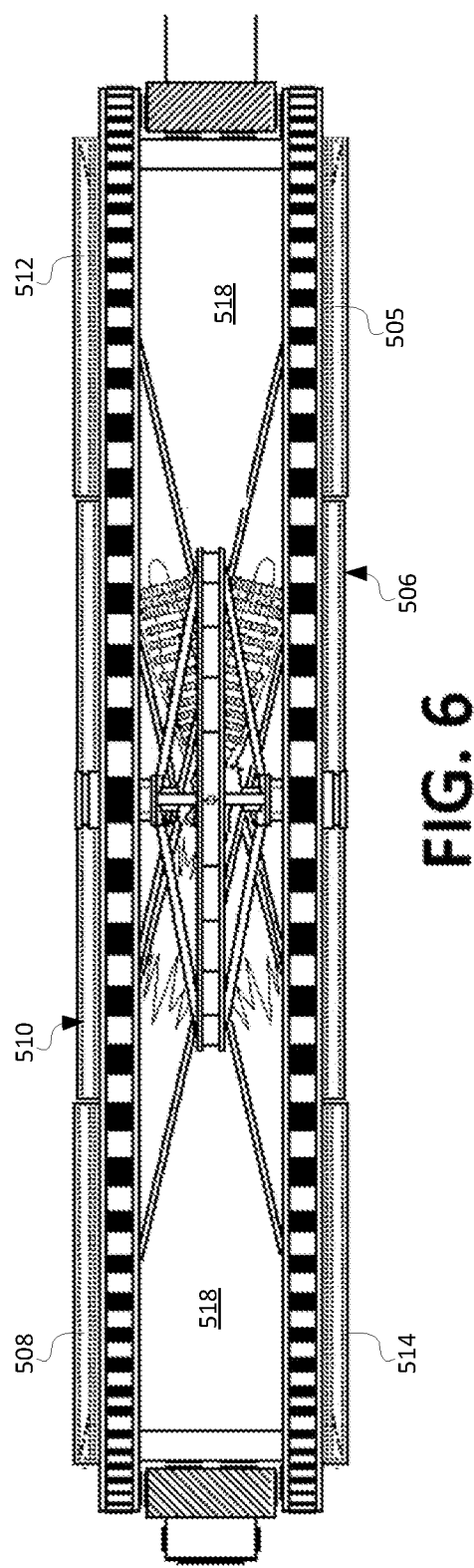

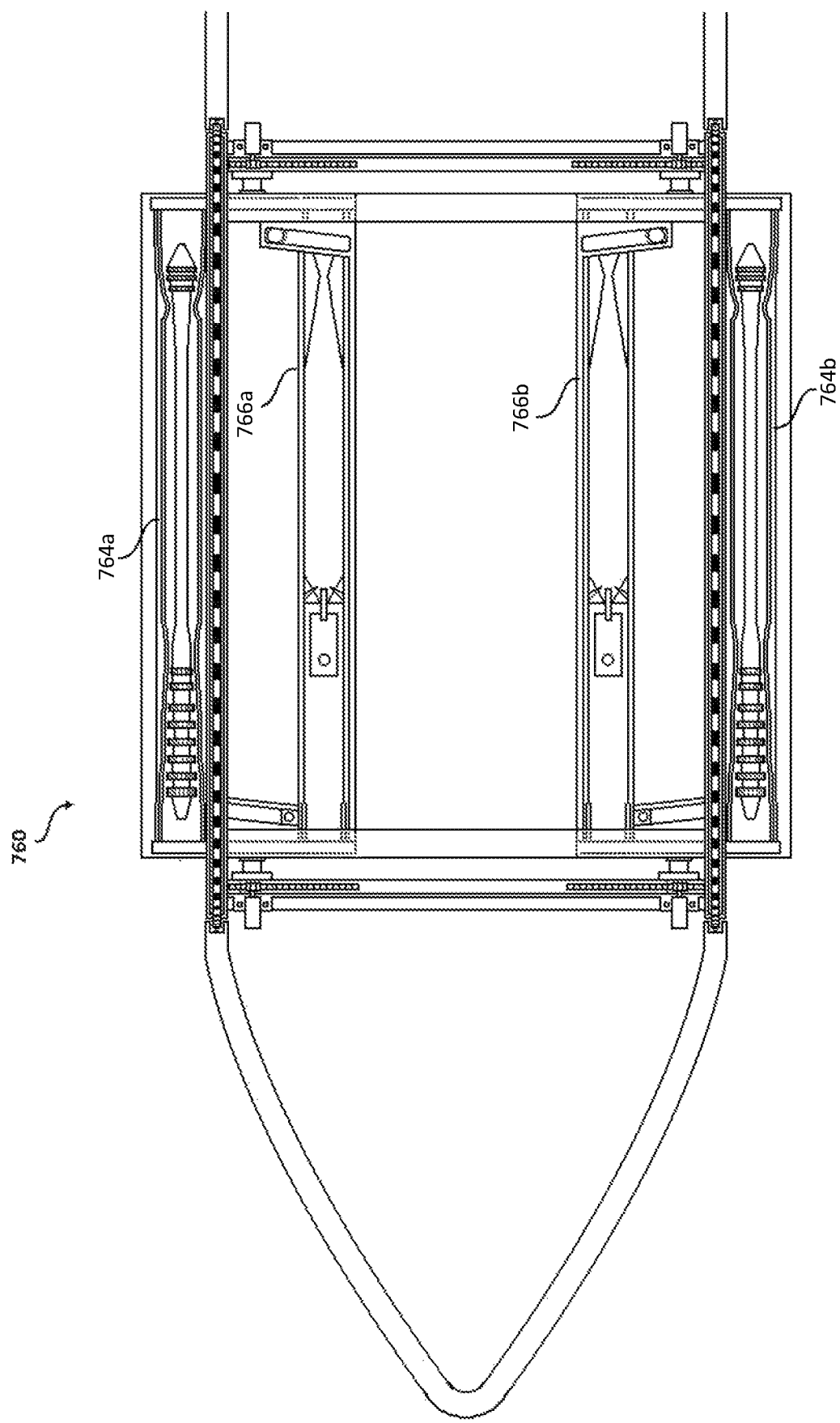

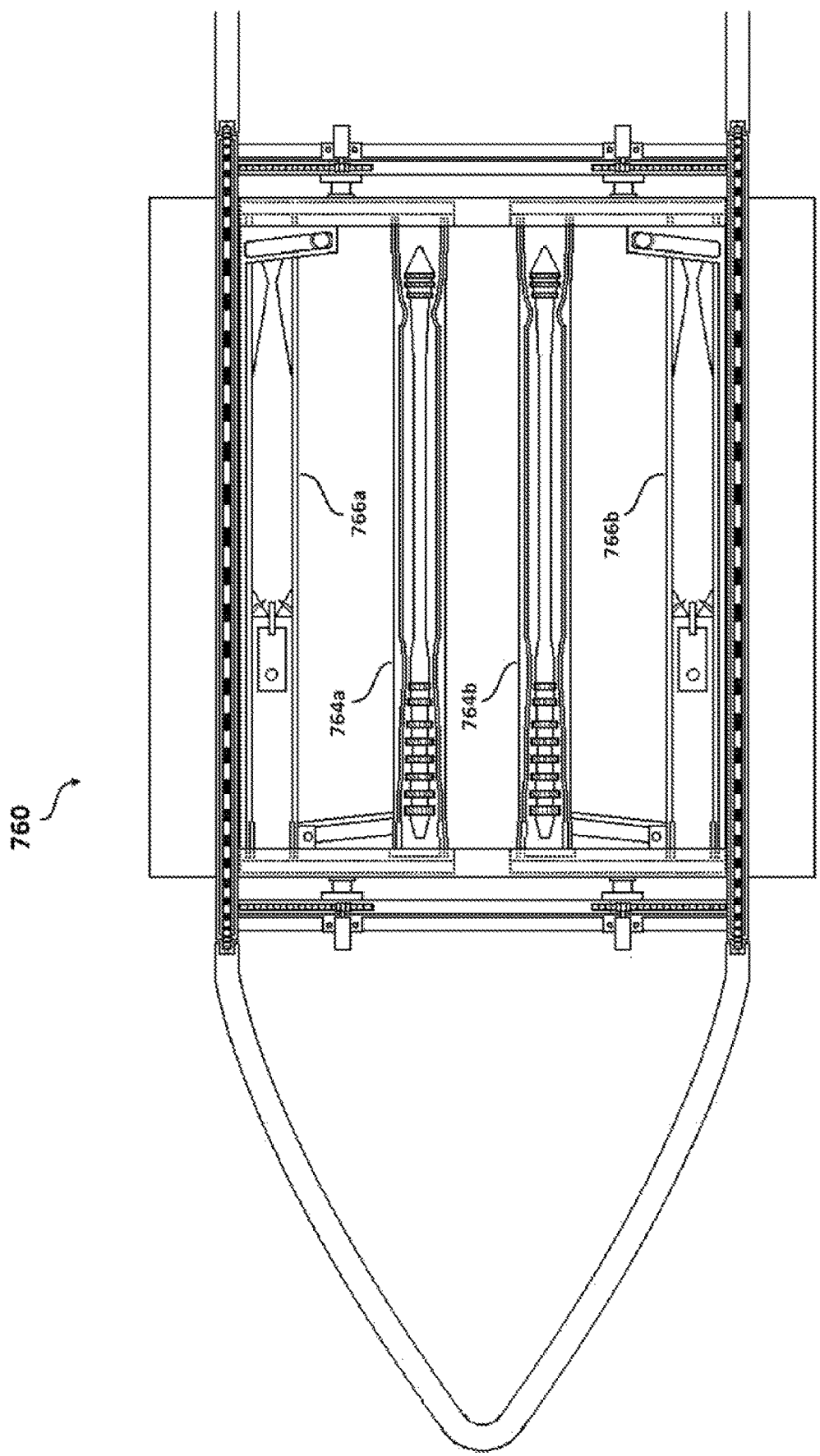

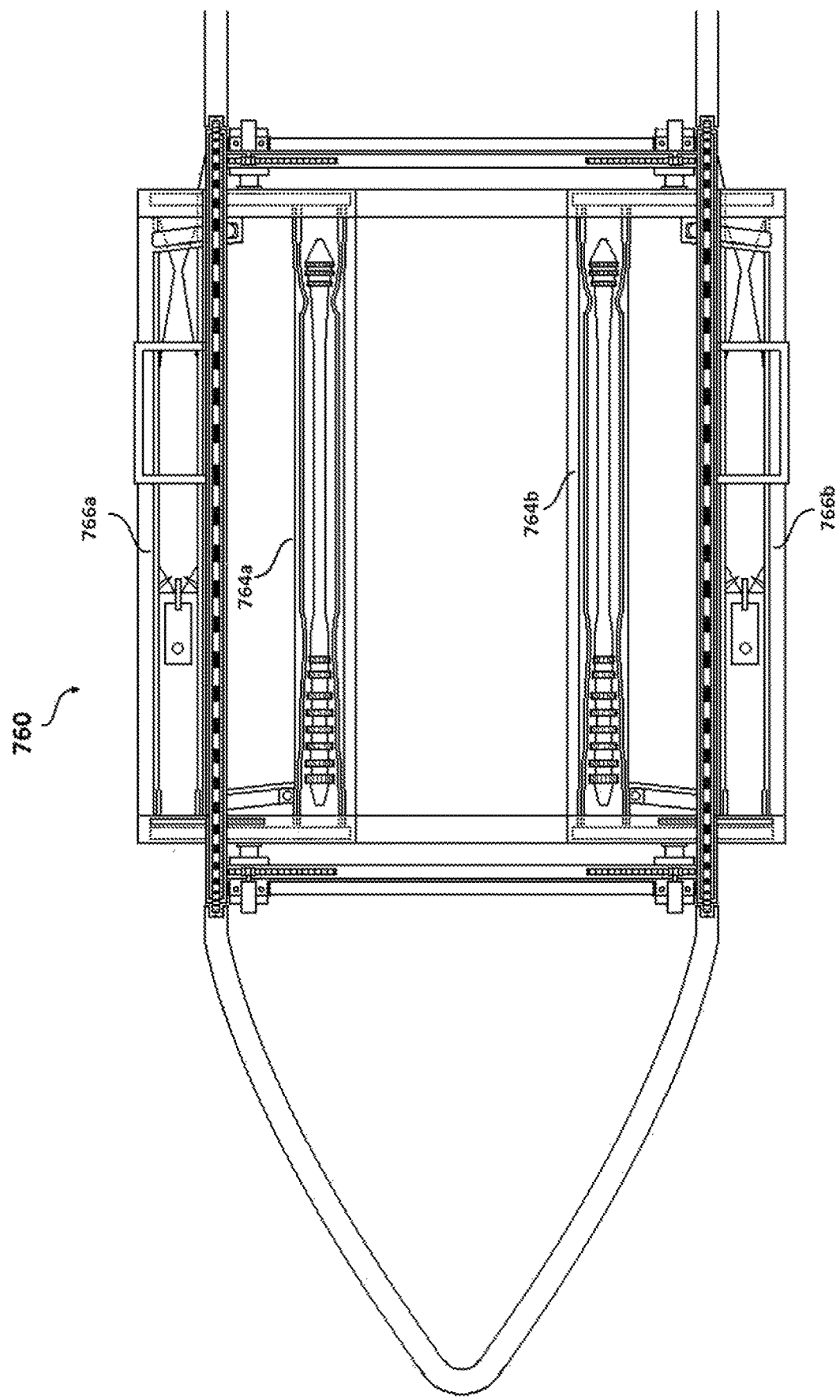

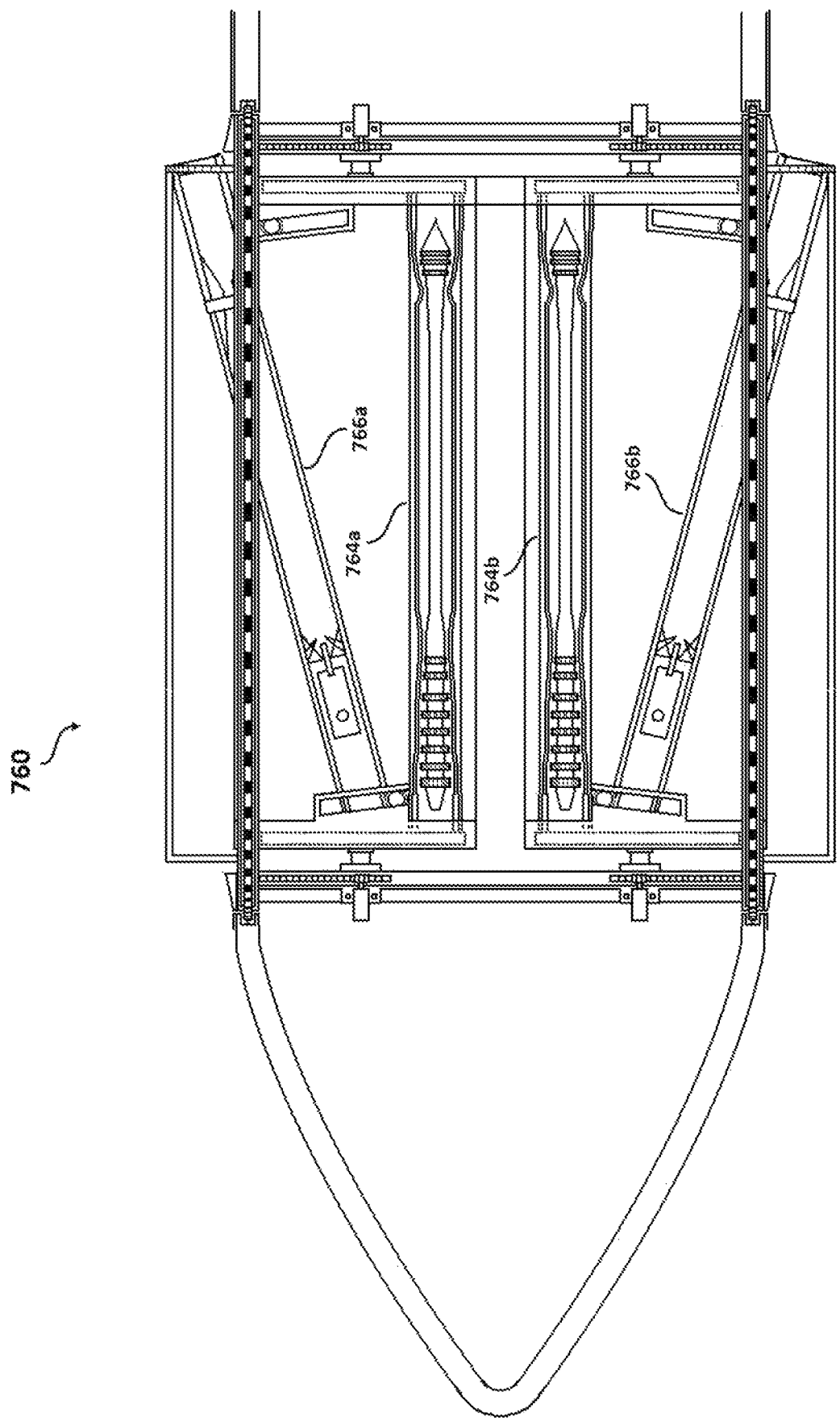

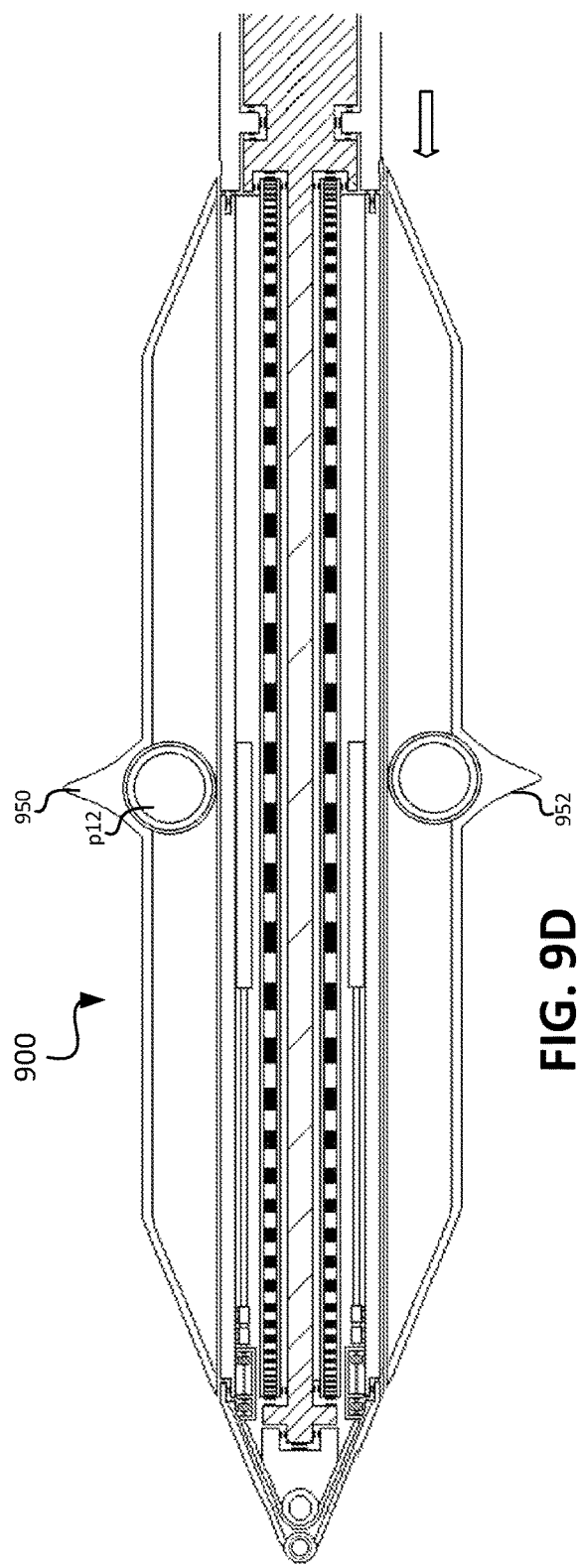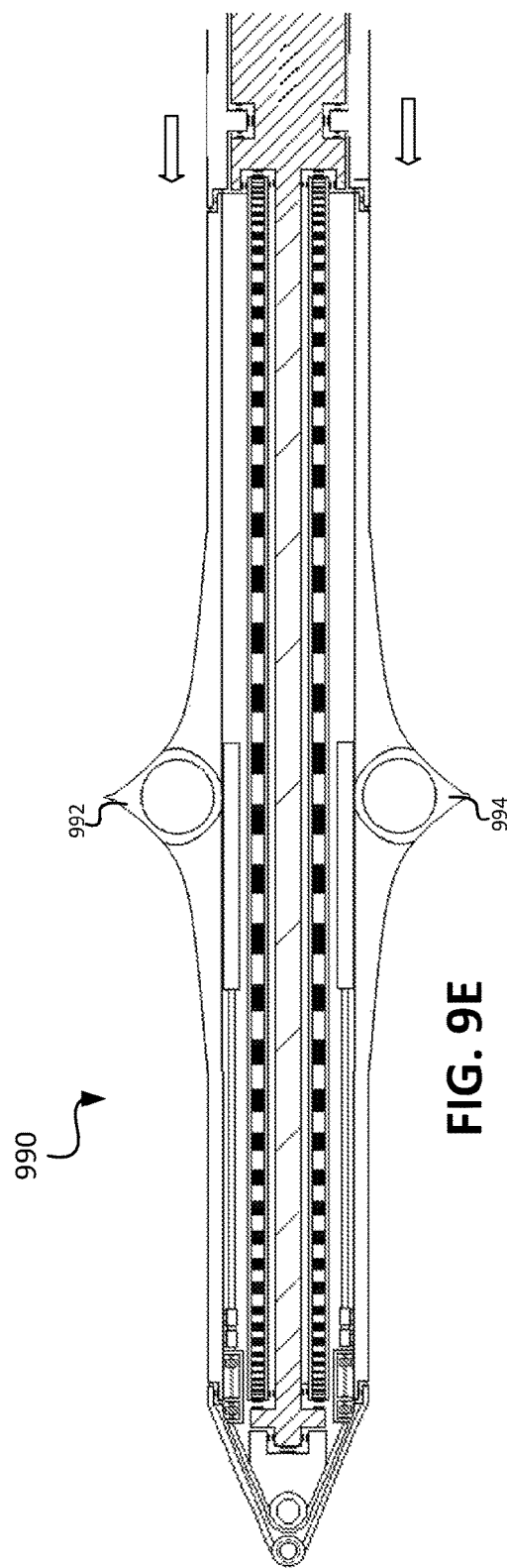

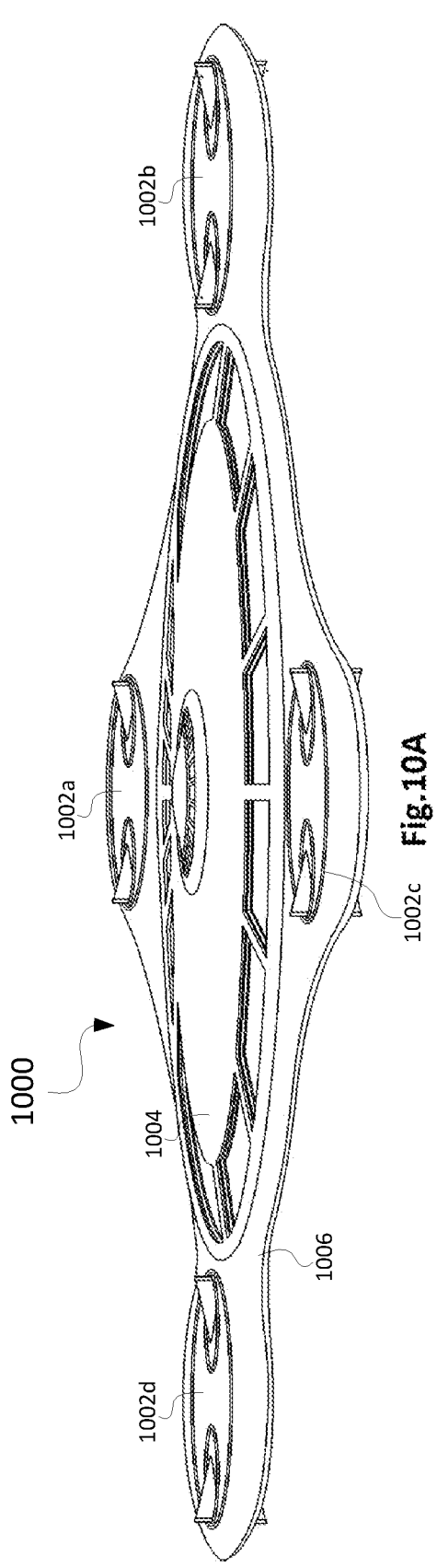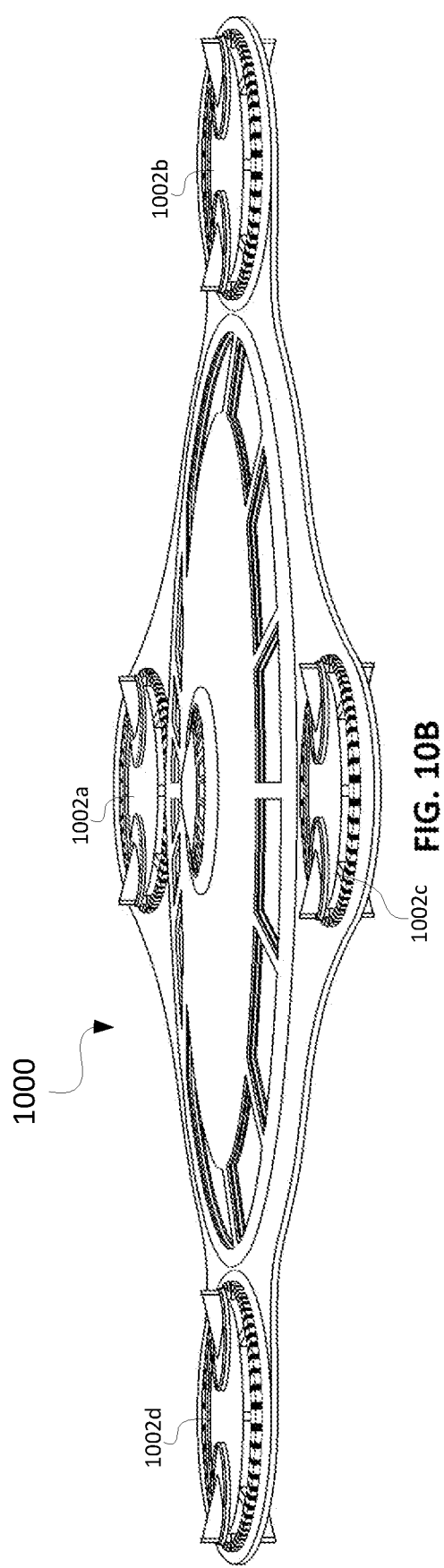

AIR AND SPACE CRAFT WITH INDEPENDENTLY ORIENTED THRUST GENERATORS

PRIORITY CLAIM

This application claims priority to U.S. Provisional Patent Application No. 62/499,759, filed on Feb. 6, 2017; U.S. Provisional Patent Application No. 62/601,356, filed on Mar. 20, 2017; U.S. Provisional Patent Application No. 62/601,821, filed on Apr. 3, 2017; and U.S. Provisional Patent Application No. 62/602,808, filed on May 8, 2017, which are incorporated by reference herein.

BACKGROUND

The present disclosure relates to technology for air and space travel.

Various kinds of aircraft are known including fixed-wing airplanes, lighter-than-air craft, helicopters. In many forms of aircraft, propulsion is provided by one or more jet engines or by a rotating propeller, or propellers, powered by internal combustion engines. Space craft are generally distinct from aircraft and require different propulsion systems, such as rockets, because jet engines and internal combustion engines generally require air to operate.

SUMMARY

An example of an aircraft includes: a fuselage having an upper surface and a lower surface; and a plurality of planetary modules housed in the fuselage, an individual planetary module having a first jet engine directed outward of the upper surface of the fuselage and a second jet engine directed outward of the lower surface of the fuselage, the individual planetary module rotatable within the fuselage about a vertical axis.

The individual planetary module may include an interior volume that maintains an internal pressure that is a higher pressure than an ambient pressure, the first and second jet engines extending through the sealed interior volume, the first and second jet engines generating thrust within the individual planetary module. The aircraft may include a first rocket engine and a second rocket engine in the individual planetary module. The aircraft may include a first engine swapping mechanism configured to swap the first jet engine and the first rocket engine such that the first rocket engine is directed outward of the upper surface of the fuselage; and a second engine swapping mechanism configured to swap the second jet engine and the second rocket engine such that the second rocket engine is directed outward of the upper surface of the fuselage. The engine swapping mechanism may comprise an axis of rotation, the first rocket engine and the first jet engine being rotatable about the axis of rotation between an active position and an inactive position. The individual planetary module may be mounted within the fuselage by means of a rotational support and placement system that includes an electrodynamic suspension system. The fuselage may be circular in cross-section along a horizontal plane and a habitable space, such as a passenger cabin may extend around a central area in a ring configuration. In other examples, habitable space, including passenger cabins may be located in the central area. The aircraft may include an automated delivery system extending in the passenger cabin to deliver items from a central location to passengers seated in the passenger cabin. The upper surface and the lower surface of the fuselage may define an airfoil shape in cross-section along a vertical plane such that horizontal movement of the fuselage through air produces a lift force in a vertical direction. The fuselage may be substantially circularly symmetric about a central axis such that horizontal movement of the fuselage in any horizontal direction produces a lift force in the vertical direction. The aircraft may include a gyroscopic system that is circularly symmetric about the central axis. The aircraft may also include one or more booster rockets physically attached to the fuselage by detachable couplings.

An example of a method of operating a heavier-than-air craft that is substantially symmetric about a central axis includes orienting the heavier-than-air craft to align a first portion of the heavier-than-air craft with a direction of travel; and subsequently rotating the heavier-than-air craft relative to the direction of travel to align a second portion of the heavier-than-air craft with the direction of travel, the second portion having a substantially similar profile to the first portion.

The method may further include rotating the heavier-than-air craft by generating thrust using a plurality thrust generators that may be rotatable through 360 degrees about axes that are parallel, or substantially parallel to the central axis. The method may include one or more of the plurality of thrust generators generating thrust directed in a direction opposite to the direction of travel. The method may include all of the plurality of thrust generators generating thrust directed in directions other than the direction of travel to change the direction of travel without changing the orientation of the central axis. The method may include, when the first portion is aligned with the direction of travel the first portion increases in temperature and rotating the heavier-than-air craft relative to the direction of travel is triggered by a temperature measured in the first portion exceeding a threshold temperature.

An example of a rotatable planetary module for providing thrust includes an upper cover; a lower cover; a first jet engine having an air intake extending through the upper or lower cover and an exhaust nozzle extending through the upper cover; a second jet engine having an air intake extending through the upper or lower cover and an exhaust nozzle extending through the lower cover; an axis of rotation that extends along a first direction through the upper cover and the lower cover; and a coupling that extends about the planetary module with circular symmetry about the axis of rotation, the coupling providing physical support for the planetary module and providing rotational freedom about the axis of rotation. The coupling may be an electrodynamic suspension system. One or more dampers may be used to selectively close and/or bypass intake or exhaust openings as needed.

An example of an aircraft includes a fuselage having an upper surface and a lower surface; and a plurality of planetary modules housed in the fuselage, an individual planetary module having a first rocket directed outward of the upper surface of the fuselage and a second rocket directed outward of the lower surface of the fuselage, the individual planetary module rotatable within the fuselage about a vertical axis.

BRIEF DESCRIPTION OF THE DRAWINGS

FIGS. 2A-B shows another example of an aircraft with circular symmetry and rotatable planetary modules.

FIGS. 4A-B show rotatable planetary modules in an aircraft.

FIG. 5 shows an example of a planetary module with two jet engines in cross section.

FIG. 6 shows another example of a planetary module with two jet engines in cross section.

FIGS. 7A-G show examples of planetary modules with jet and rocket engines.

FIGS. 9A-E show an example of a planetary module with engine swapping mechanism.

FIGS. 10A-B show an example of a non-circular aircraft with four planetary modules.

DETAILED DESCRIPTION

Certain embodiments of the present technology described herein relate to air and space craft that provide a high degree of maneuverability by generating thrust in planetary modules that are rotatable to allow thrust direction to be modified. Thrust may be generated by jet engines and/or rocket engines located in such planetary modules and thus may be used in air and/or space.

In an embodiment, a combined aircraft/spacecraft is symmetric about a central vertical axis so that it has a disk shape (i.e. shaped like "a flying saucer"). The fuselage of such an aircraft may be shaped so that lift is generated as the craft moves laterally through air. (Because it flies through air, it may be referred to as an "aircraft" although unlike conventional aircraft it may not be limited to air travel and may also operate as a spacecraft. The term "aircraft" is used herein to refer to a craft capable of, but not limited to, flying through air.) Separate wings are not required in such an aircraft because the fuselage has an airfoil shape (i.e. an airfoil shape in cross section). Propulsion may be provided by jet engines in planetary modules that generate thrust when flying in the atmosphere. This allows thrust generated by jet engines to be directed in various directions as desired to control acceleration, deceleration, direction of travel, and orientation when in air.

In an embodiment, propulsion may alternatively be provided by rocket engines in planetary modules that generate thrust when flying in space (e.g. above approximately 70,000 feet). This allows thrust generated by rocket engines to be directed in various directions as desired to control acceleration, deceleration, direction of travel, and orientation when in space. Rocket engines may be located in the same planetary modules as jet engines or may be located in separate planetary modules.

Figure 1A:
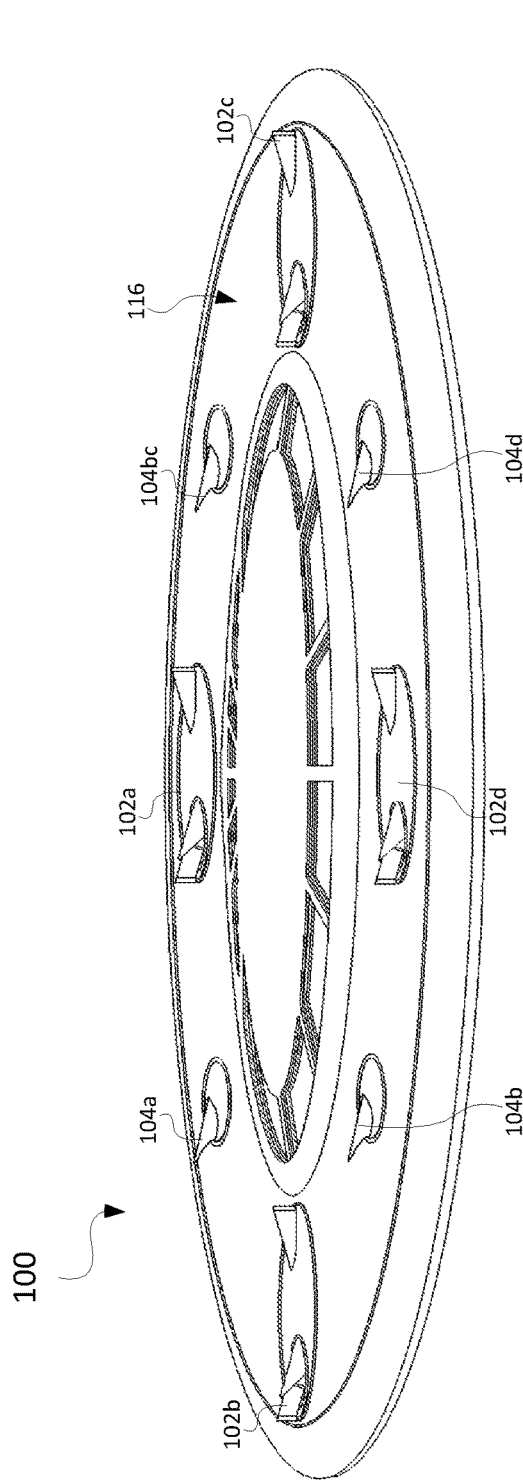
FIGS. 1A-B illustrate an aircraft with circular symmetry and rotatable planetary modules.

FIG. 1A shows an example of an aircraft 100. Aircraft 100 is disk shaped, with an upper surface, and lower surface (not visible in FIG. 1A) that meet along a circular perimeter. Unlike a conventional aircraft that has wings and a fuselage, aircraft 100 has a fuselage that is wing-shaped in cross section so that lift is produced when aircraft 100 moves horizontally through the air. Aircraft 100 is symmetric about a central axis so that travel in any horizontal direction (a direction perpendicular to the central axis) produces lift. The lift force generated is independent of the orientation of aircraft 100 about the central axis. Thus, aircraft can fly equally well forwards, backwards, or sideways. It will be understood that the terms "forwards," "backwards" and "sideways" are generally used with respect to an aircraft or other object that has a clearly defined nose, tail, and sides, whereas aircraft 100 is circularly symmetric and does not have such easily identified features, and it will be understood that a designated portion of aircraft 100 may be considered the front, while an opposing portion may be considered the back, and portions laterally disposed on either side may be considered "sides" for purposes of discussing orientation, although such designations may be arbitrary for some aircraft that do not have a preferred orientation when flying.

Conventional aircraft have engines (e.g. jet or turboprop engines) mounted to generate thrust along the direction of travel, which generally means that such engines are permanently mounted to generate thrust substantially parallel to an aircraft fuselage. Wings are configured so that they generate lift when the aircraft moves along this direction of travel. Changes in the direction of travel require changing the orientation of such an aircraft, i.e. such aircraft travel nose-first, and the nose of the aircraft must be turned to the new direction of travel. Such a change in direction may require banking and turning through a relatively wide radius to reach the new orientation. Changing direction is generally accomplished using a rudder and/or ailerons rather than by changing the direction of thrust.

In contrast with conventional aircraft, aircraft 100 includes planetary modules 102a-d within the fuselage, mounted so that they are rotatable within the fuselage and can direct thrust in different directions. Each planetary module is rotatable within the fuselage about a vertical axis (i.e. an axis that is parallel to, or substantially parallel to the central axis of the aircraft). Planetary modules may be rotatable through 360 degrees, or some angular range that is less than 360 degrees, e.g. through 270 degrees, 180 degrees or some other range. While aircraft 100 has four planetary modules 102a-d, it will be understood that the number of modules may vary and that the four modules shown are by way of example. Planetary modules that generate thrust may be provided in various ways and may have a variety of configurations depending on the application. Various examples of planetary modules are provided below.

In addition to planetary modules 102a-d, aircraft 100 has fins 104a-d that are rotatably mounted on the upper surface 116 of aircraft 100. Fins may be rotatable through 360 degrees, or some angular range that is less than 360 degrees. Fins 104a-d may be used to maneuver aircraft 100 in flight. Fins 104a-d may be used with planetary modules 102a-d to control the direction of travel of aircraft 100. Fins 104a-d may provide directional control in case of loss of power when planetary modules 102a-d may not generate thrust. In some examples, one or more fins may be fixed e.g. two of four fins may be fixed while two are rotatable, or all four may be fixed. The number of fins may vary. In some examples, no fins may be provided, while in other cases one or more fins (e.g. four fins) may be provided. Fins may also be provided along a lower surface of an aircraft. Fins may protrude a fixed distance from a surface of aircraft 100, or may be retractable, or partially retractable. For example, fins may be used for maneuvering in air and may be retracted when flying through space. Some fins may retract, or partially retract, while others remain fixed.

Figure 1B:
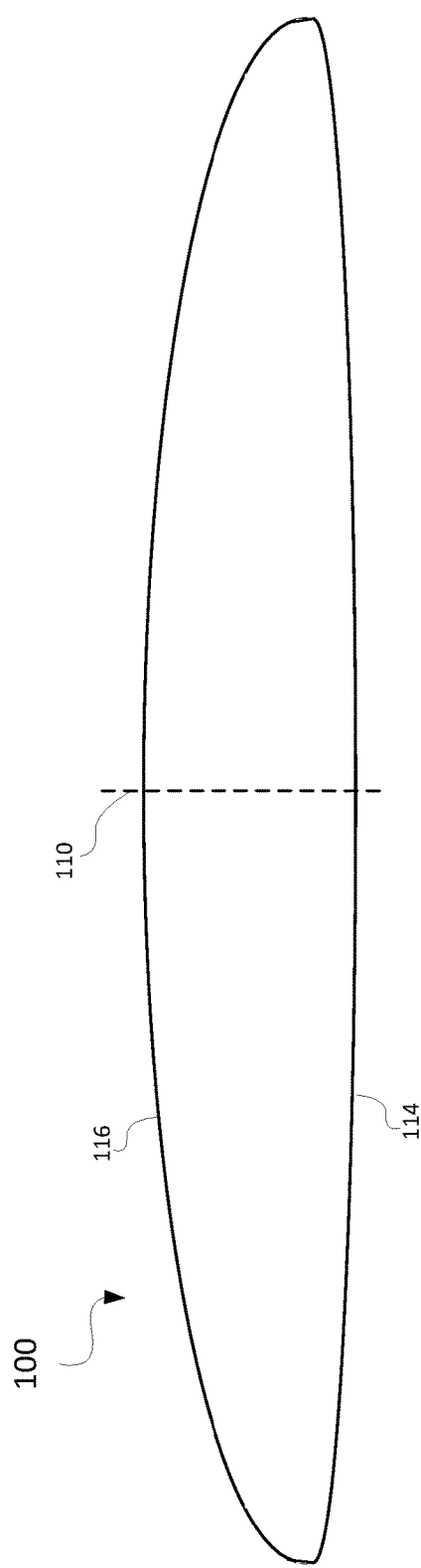

FIG. 1B shows aircraft 100 in cross section along a diameter that intersects central axis 110. FIG. 1B illustrates the airfoil shape of aircraft 100 that generates lift. It can be seen that lower surface 114 is flatter than upper surface 116 so that upper surface 116 forms a "suction surface" while lower surface 114 forms a "pressure surface" when aircraft 100 moves laterally through air, i.e. moves in a direction perpendicular to central axis 110. A variety of different profiles may be used to generate an appropriate lift force according to requirements. For example, high speed aircraft may have a lower profile and may create less lift at a given speed, while slower aircraft (e.g. cargo aircraft) may have a higher profile and create more lift at a given speed to enable them to fly with relatively heavy cargo. The profile of an aircraft 100 may be configured according to its design weight and speed range so that when it operates in its designed speed range, the lift generated is greater than its design weight.

FIG. 2A shows an example of an aircraft 200 that includes multiple planetary modules. In this case, there are two kinds of planetary modules. First planetary modules 220a-d contain jet engines to provide thrust when in air. In this example, each first planetary module includes two jet engines, a first jet engine directed outward of the upper surface of the fuselage and a second jet engine directed outward of the lower surface of the fuselage (not visible in FIG. 2A). Both jet engines of a planetary module may be substantially aligned in their lateral orientation, i.e. if a planetary module is oriented to direct thrust in a northerly direction, then both jet engines of the module are directed towards the south to generate thrust towards the north. Jet engines may be arranged in an X configuration so that the first jet engine has an air intake on the lower surface (not shown) and an exhaust on the upper surface, while the second jet engine has an air intake on the upper surface and an exhaust on the lower surface (not shown).

Second planetary modules 222a-d contain rocket engines to provide thrust when in space. Rocket engines may be mounted in planetary modules similarly to jet engines. A first rocket engine directed outward of the upper surface of the fuselage and a second rocket engine directed outward of the lower surface of the fuselage. Both rocket engines of a planetary module may be substantially aligned in their lateral orientation, i.e. if a planetary module is oriented to direct thrust in a northerly direction, then both rocket engines of the module are pointed towards the south so that their thrust is directed towards the north. Rocket engines are arranged in an X configuration so that the first rocket engine has an exhaust on the upper surface, while the second rocket engine has an exhaust on the lower surface. In addition, while no fins are shown in FIG. 2A, fins may be provided on aircraft surfaces in this and other embodiments. Also, not visible in FIG. 2A are retractable spoilers around the edge of aircraft 200, which may be used to provide increased drag for slowing down or turning aircraft 200. FIG. 2B illustrates a spoiler 224 in an extended position where it produces increased drag in air (spoilers may remain retracted in space). Any suitable number of spoilers may be positioned around the outer edge of aircraft 200 and may be centrally controlled to produce drag as required.

Figure 3A:
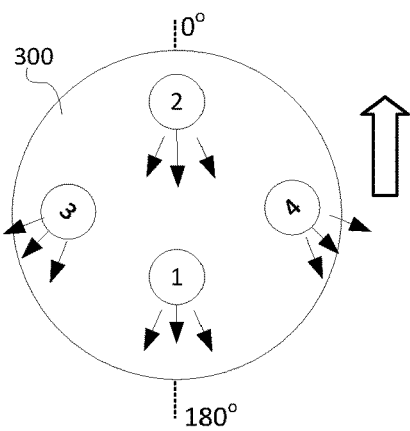
FIGS. 3A-G illustrate examples of using rotatable planetary modules in an aircraft.

FIG. 3A-F illustrate how planetary modules, including planetary modules having rocket and/or jet engines, may be oriented differently in flight. FIG. 3A shows planetary modules 1-4 of aircraft 300 in top-down view including exhaust (indicated by arrows coming from each respective planetary module 1-4. The direction of travel is indicated by the arrow (up the page in this view). In general, the direction in which exhaust is expelled is opposite to the direction in which thrust is generated so that thrust is generally along the direction of travel in FIG. 3A. Planetary modules 3 and 4 are shown with their thrust directed outwards from the centerline of aircraft 300 in a balanced arrangement to create net thrust along the direction of travel. This configuration may be used to maintain stability for example when taking off or landing when there is insufficient speed for fins and/or spoilers to maintain stability. Planetary modules 3 and 4 may provide side forces to stabilize aircraft at low speed.

Figure 3B:
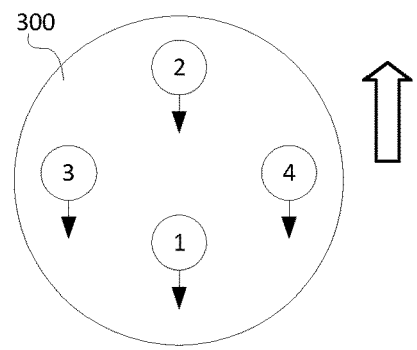

FIG. 3B shows a simplified top-down view that is similar to FIG. 3A. In this case, arrows indicate the direction in which exhaust is expelled (opposite to the direction of thrust). Thus, in FIG. 3B all planetary modules are aligned along the direction of travel (up the page) to generate thrust in the direction of travel, with exhaust being expelled in the opposite direction. This may be considered a linear travel mode of operation in which all planetary modules 1-4 are aligned along the direction of travel to keep aircraft 300 travelling in the same direction.

Figure 3C:
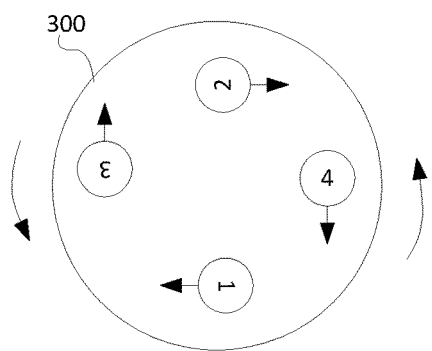

FIG. 3C shows an example of how planetary modules may be used to direct thrust in different directions and thereby rotate the aircraft 300. FIG. 3C is a top-down view. As can be seen, planetary modules 1-4 are oriented in a circumferential arrangement so that their thrust generates a turning force and causes aircraft to rotate counter-clockwise as shown.

Figure 3D:
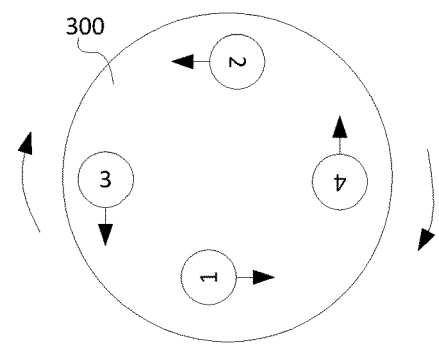

FIG. 3D shows an example in which the orientations of planetary modules 1-4 are opposite of that shown in FIG. 3C so that they generate a turning force in the opposite direction. The result is clockwise rotation of the aircraft as shown. No direction of travel is indicated in FIGS. 3C-D. Rotation may occur independently of the direction of travel, and may occur without travel, i.e. when an aircraft is not moving laterally. It will be understood that rotation may be combined with lateral movement so that an aircraft may rotate as it is flying. This may be achieved with relatively small changes to thrust directions, e.g. by offsetting planetary modules 1-4 a few (<10) degrees from the direction of travel and/or by modifying power generated by different planetary modules (decreasing power on one side while increasing power on an opposing side for example). As an aircraft rotates to a new orientation, planetary modules may realign accordingly so that their thrust is directed as appropriate (e.g. directed along the direction of travel to accelerate, or directed opposite the direction of travel to decelerate). Such rotation may be achieved while flying level to the ground, i.e. while maintaining the orientation of the central axis substantially vertical with respect to the ground, so that no banking is needed.

Figure 3E:
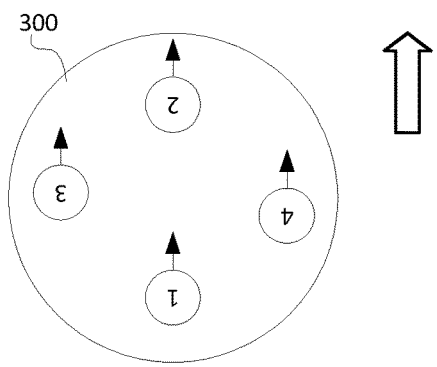

FIG. 3E shows an example in which all planetary modules 1-4 are aligned to generate thrust in a direction that is opposite to the direction of travel. The direction of travel is up the page in FIG. 3E and all planetary modules direct thrust up the page. This may be used to provide deceleration. For example, when preparing to land, an aircraft may reduce speed by reversing thrust of one or more planetary modules. Also, when an aircraft that is configured for space travel reenters the atmosphere, reverse thrust may decelerate the aircraft to keep its reentry speed at a safe level and to control reentry trajectory.

Figure 3F:
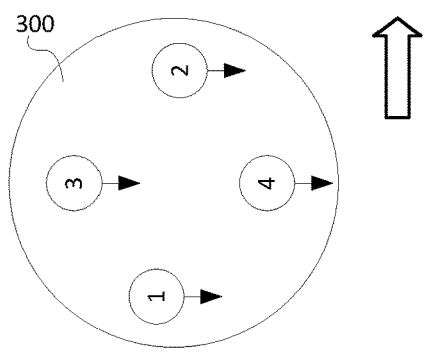

FIG. 3F illustrates an example in which the direction of thrust of all planetary modules 1-4 is perpendicular to the direction of travel (indicated by the large arrow). This configuration allows for a rapid change in direction without the need for banking or otherwise changing the orientation of the aircraft (e.g. lateral travel direction may change while central axis remains vertical). An aircraft may change from travelling North to travelling West without changing its orientation. Thus, in this example all of the thrust generators are generating thrust directed in directions other than the direction of travel to change the direction of travel. This is done without banking, i.e. without changing the orientation of the central axis (which is perpendicular to the top-down view shown). It will be understood that in addition to modifying the direction of thrust, the amount of thrust generated by each planetary module may be controlled to create a turning force (e.g. increasing thrust on one side and/or reducing on an opposing side).

Figure 3G:
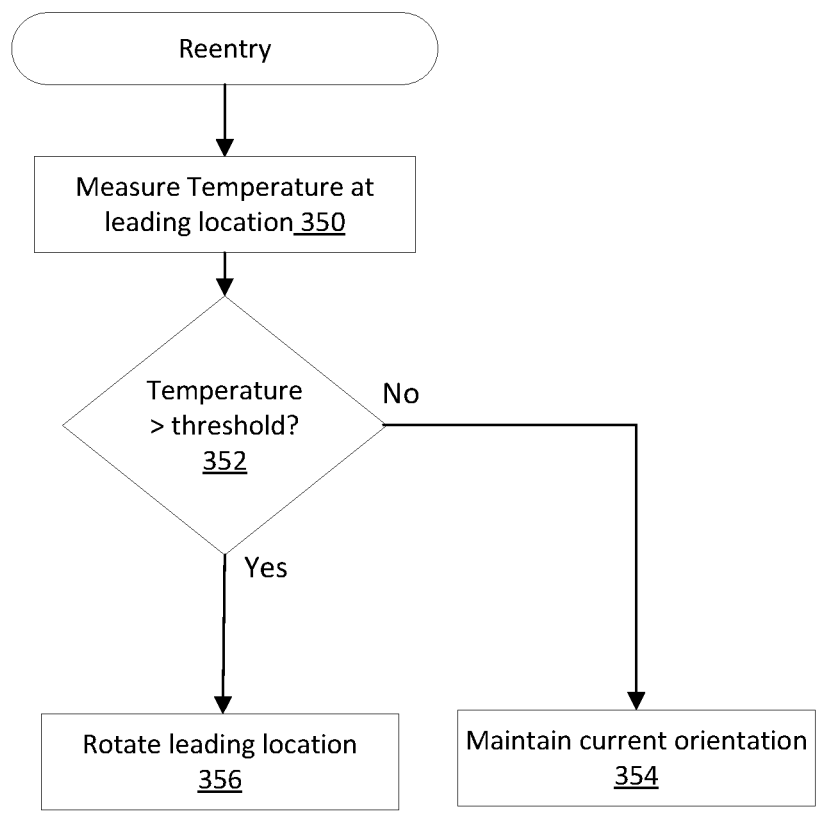

FIG. 3G illustrates how rotating an aircraft to change its orientation while under way may provide significant benefits. Specifically, FIG. 3G shows a method of operating an aircraft that has circular symmetry (substantially symmetric about a central axis) and has a thrust generator, or thrust generators, that can change their direction of thrust to rotate the aircraft, e.g. rotatable planetary modules. This method may be used during reentry into the earth's atmosphere by an aircraft that is configured for air and space travel. During reentry, the temperature is measured 350 at a leading location of the aircraft. Multiple temperature transducers may be located on or near the surfaces of the aircraft, particularly along portions of the aircraft that tend to become hot during reentry. Generally, heat generated by friction during reentry is concentrated at the leading portion of a spacecraft. Temperature transducers may be located along, or close to, the edge of a circularly symmetric aircraft (i.e. close to where the upper surface and lower surface meet). Some location along the edge may be considered a leading location at any given time (i.e. some portion of the aircraft is a lead portion at a given time). The temperature of the leading location is measured and is compared with a threshold temperature to determine if the temperature of the leading location is greater than the threshold temperature 352. If the temperature at the leading location is not greater than the threshold temperature then the aircraft may maintain the current orientation 354. If the temperature at the leading location is greater than the threshold then the aircraft may be rotated 356 (e.g. using planetary modules to offset thrust from the direction of travel) thereby rotating the leading location. The former lead portion can then cool down while a new portion is rotated to the front to become the lead location. In this way, heat generated by friction during reentry may be distributed among various portions of the aircraft instead of concentrating the heat in a particular portion (e.g. a nose section). When a given portion becomes hot, it is rotated out of the lead position so that heat can dissipate. Since both portions have substantially the same profile there is little or no change in drag or friction from such a change in orientation. In some cases, rotation may be continuous and an aircraft may rotate with an angular velocity that is controlled to ensure that heat is distributed adequately and no portion exceeds a threshold temperature.

Planetary modules may be mounted within a fuselage in various ways. FIG. 4A shows an example of an aircraft 400 in which planetary modules 440a-d are rotatably mounted using an electrodynamic suspension system. Electrodynamic suspension is a form of magnetic levitation in which conductors are exposed to time-varying magnetic fields. This induces eddy currents in the conductors that create a repulsive magnetic field. The repulsive magnetic field holds the two objects apart or, at least, reduces contact. Time varying magnetic fields can be caused by relative motion between two objects such as between an electrodynamic ring around a planetary module and a corresponding electrodynamic ring in a planetary module receptacle in an aircraft. Magnetic fields may be controlled to maintain a fixed distance between an outer surface of a planetary module and an inner surface of the aircraft (e.g. using electromagnets arranged around an opening in the aircraft that encircles the planetary module).

Planetary modules 440a-d may lock into position and electrodynamic suspension may be switched off when they are expected to maintain the same orientation for an extended period. When planetary modules are to be rotated, the electrodynamic suspension may be activated so that planetary modules may be easily be rotated within the aircraft. In some cases, stepper motors, servo motors, or other electrical motors are used to mechanically turn planetary modules within an aircraft.

FIG. 4A shows a cut-away view of planetary modules 440a-d in their operating position within aircraft 400. It can be seen that planetary modules 440a-d are substantially flush with surfaces of aircraft 400 so that aircraft 400 is aerodynamic. A planetary module has an upper cover that is substantially flush with the upper surface of the aircraft and a lower cover that is substantially flush with the lower surface of the aircraft. Openings for intake and/or exhaust may be designed to be aerodynamic and may include retractable covers to reduce drag when not in use e.g. rocket exhaust may be covered when rocket is not in use and the intake and/or exhaust of a jet engine may be covered when the jet is not in use. In some cases, a scoop may project outward of a surface of an aircraft to facilitate air intake for a jet engine. Such a scoop may be retractable to reduce drag when the jet engine is not in use. In some cases, a retractable scoop may cover the air intake when it is in the retracted position. In some cases, a nozzle may project outward of a surface of an aircraft to direct the exhaust of a jet or rocket. Such a nozzle may be retractable to cover the exhaust when not in use.

FIG. 4B shows an exploded view of some components of aircraft 400. Planetary modules 440a-d are shown separately from respective receptacles 442a-d in aircraft 400. An individual planetary module 440a is designed to fit in corresponding receptacle 442a so that an upper cover of planetary module 440a is flush with an upper surface of aircraft 400 and a lower cover of planetary module 440a is flush with a lower surface of aircraft 400 (some elements may extend beyond the surfaces such as fins, nozzles, cowlings, or other projecting components). Rings of electromagnetic elements extend about planetary modules and receptacles as components of the electromagnetic suspension system that allows planetary modules to be rotated. For example, planetary module 440a has rings 444 of magnetic elements (two rings in this example) that are coupled with rings of corresponding electromagnetic elements around an inner surface of receptacle 442a. Rings of electromagnetic elements around inner surface of receptacle 442a may be controlled to position planetary module 440a and to rotate it as desired.

FIG. 5 illustrates an example of a planetary module 500 in cross section, showing two jet engines 502, 504 arranged in an X configuration. A first jet engine 502 extends from bottom right to top left, having an air intake 505 extending through a lower surface 506 and having an exhaust nozzle 508 extending through an upper surface 510. Thus, first jet engine 502 is directed outward of upper surface 510 and toward the left side of FIG. 5 to generate thrust to the right side. A second jet engine 504 extends from the top right to the bottom left, having an air intake 512 extending through upper surface 510 and having an exhaust nozzle 514 extending through the lower surface 506. Thus, the second jet engine is directed outward of the lower surface and toward the left side of FIG. 5 to generate thrust to the right side. First and second jet engines 502, 504 may be offset from a central axis of the planetary module 500 so that they do not intersect. FIG. 5 also shows a fuel tank 518 located within planetary module 500. In some cases, a fuel tank within a planetary module may provide fuel to jet engines when a planetary module is unable to obtain fuel from a main fuel source that is external to the planetary module. Such a local source of fuel may have advantages at times, for example, when pumping fuel from other areas of the aircraft may be difficult or impossible (e.g. in emergency situations, loss of power, during high-speed maneuvers when g-forces are high).

FIG. 6 shows another example of a planetary module including two jet engines in an X configuration with air intakes and exhaust nozzles retracted. In this configuration, air intake 512 is retracted so that it is flush with upper surface 510 and exhaust nozzle 508 is also retracted and s flush with upper surface 510. Similarly, air intake 505 and exhaust nozzle 514 are retracted and are flush with lower surface 506. This configuration may seal jet engines when in space and may provide less drag when in air and the jet engines are not in operation.

Figure 7A:
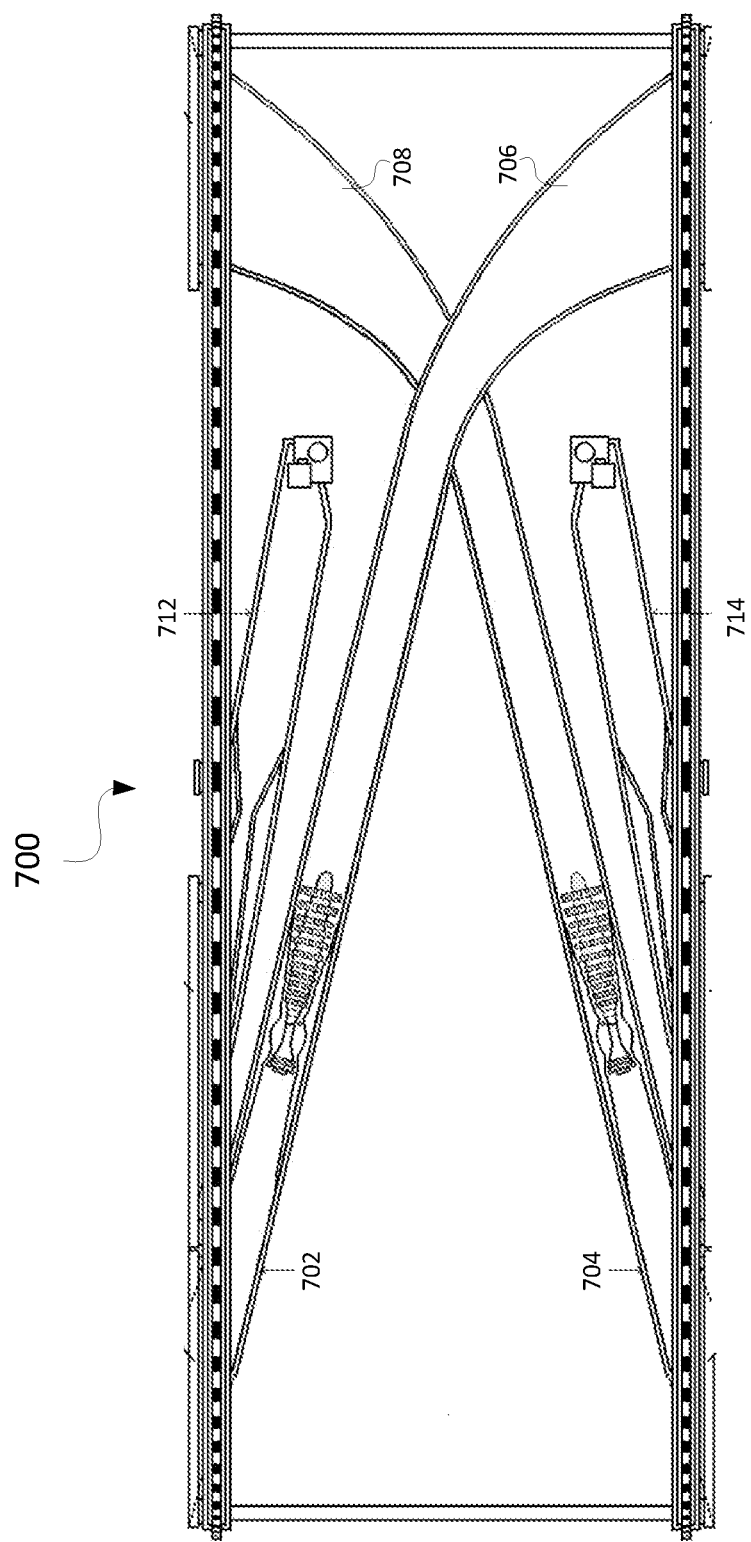

FIG. 7A shows another example of a planetary module 700 including two jet engines 702, 704. In this example, jet engines 702, 704 are configured with separate air intake ducts 706, 708 that substantially redirect air provided to the jets so that jets may be oriented in a near-horizontal configuration and thus generate thrust that has a large lateral component. Jet engine 702 is coupled to air intake duct 706 and jet engine 704 is coupled to air intake duct 708. In other examples exhaust ducts may redirect exhaust gasses. For example, exhaust gas from an upper jet may be redirected from its initial direction (along the axis of rotation of the jet turbines) to a more vertical direction so that exhaust gas is directed downwards in a near-vertical direction. This may produce thrust that has a larger vertical component than if the exhaust was not redirected. Vertical thrust provided by this configuration may be useful during takeoff and landing when lift provided by lateral movement is not sufficient. In some cases, redirecting may be configurable as needed using a movable duct or nozzle so that thrust may be directed vertically for takeoff and landing and may be more lateral during flight. Both air intake and exhaust ducts may redirect air and exhaust gas respectively so that redirecting may be performed at the intake side, the exhaust side, or both intake and exhaust sides.

While planetary module 700 of FIG. 7A has two jet engines that are mounted in similar configurations, oriented in mirror-image orientations, in other examples, two jet engines in a planetary module may have different configurations.

In addition to jet engines 702, 704, planetary module 700 includes rocket engines 712, 714, which are paired with corresponding jet engines 702, 704. Rocket engine 712 is paired with jet engine 702, having a parallel orientation. Rocket engine 714 is paired with jet engine 704, having a parallel orientation. In some examples, a planetary module may switch between jet engines and rocket engines according to conditions while maintaining thrust in the same direction. For example, rocket engines may be used in space while jet engines are used in air.

Figure 7B:
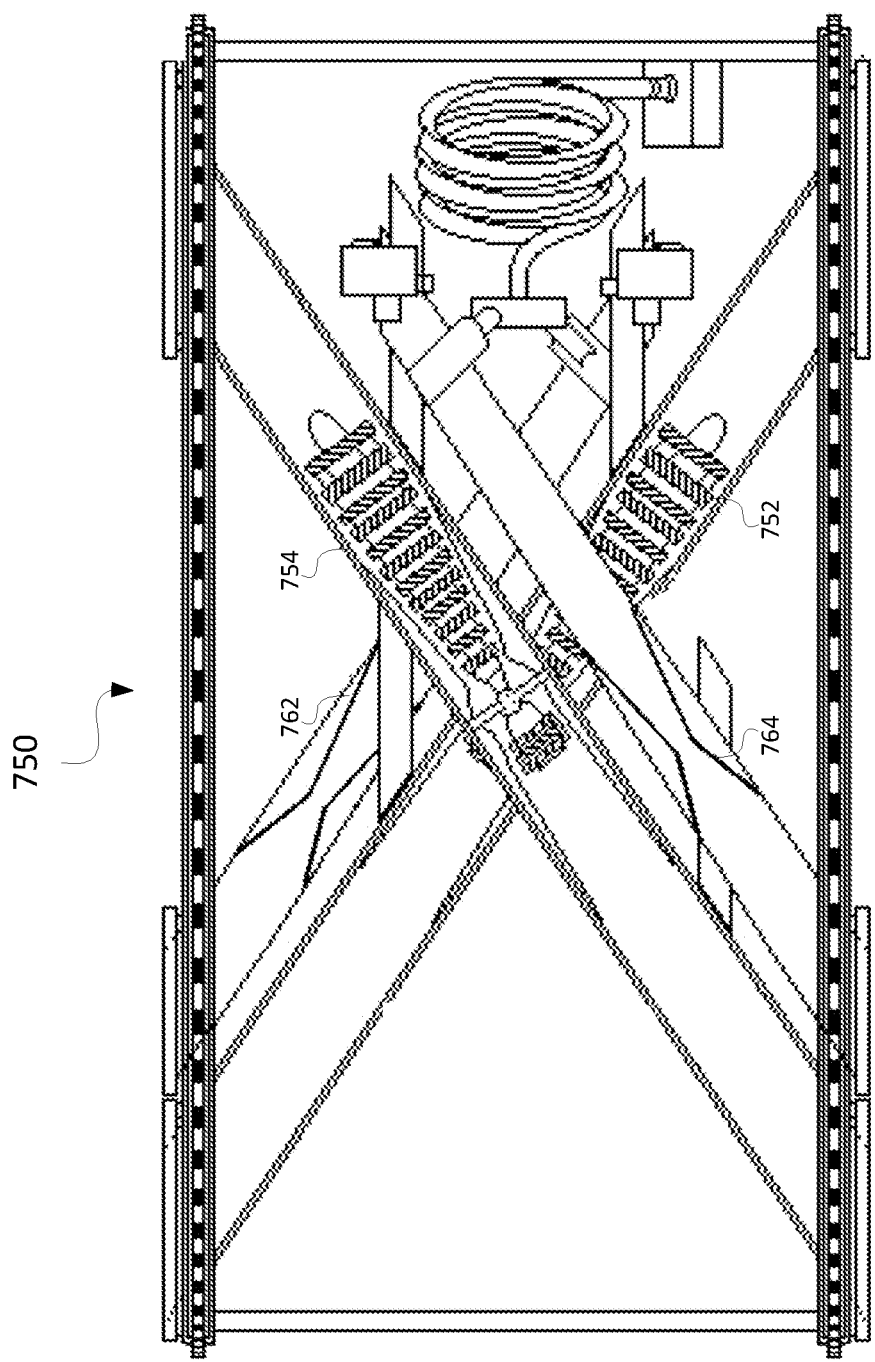

FIG. 7B shows another example of a planetary module 750 that includes both jet engines 752, 754, and also rocket engines 762, 764. Jet engine 752 is paired with rocket engine 762 so that they are parallel and have exhaust outlets close together on the top of planetary module 750. Jet engine 754 and rocket engine 764 are paired so that they are parallel and have exhaust outlets close together on the bottom of planetary module 750. In this example, jet engines 752, 754 are arranged in an X configuration as are rocket engines 762, 764.

Some planetary modules may be configured with jet engines, while other planetary modules are configured with rockets. A single module may also be configured with both jet engines and rocket engines as previously shown. Jet engines and rocket engines may be mounted so that their positions within a planetary module are fixed (i.e. they rotate as parts of the planetary module but retain their respective positions within the planetary module). Alternatively, jet engines and rocket engines may be mounted so that they can move within a planetary module thereby allowing reconfiguration of the planetary module. For example, a jet engine may be paired with a rocket engine so that they can be swapped as required. When flying through air, the jet engine may be in an active position and the rocket engine may be in an inactive position. When flying through space, the rocket engine may be in the active position and the jet engine may be in the inactive position. A suitable engine swapping mechanism may be configured to swap engines as needed so that the appropriate engine is active at any time.

Figure 7C:
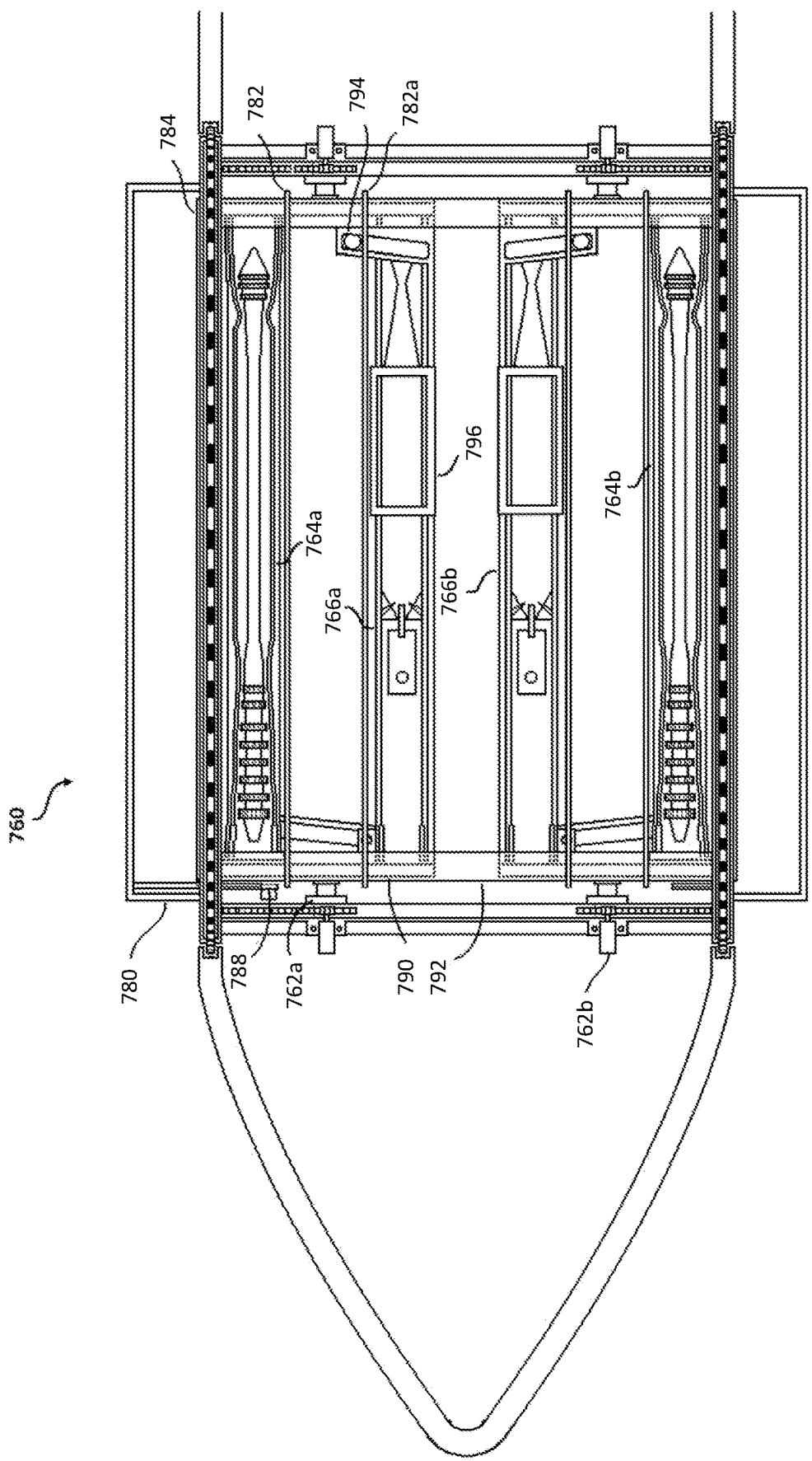

FIG. 7C shows a cross section of another planetary module 760 that includes rocket and jet engines with engine swapping mechanisms. In this example, an upper engine swapping mechanism 762a is configured to move upper jet engine 764a and upper rocket engine 766a, while a lower engine swapping mechanism 762b is configured to move lower jet engine 764b and lower rocket engine 766b. Engines are shown in retracted positions where they are inactive. An engine cover-rudder 780 is provided along the upper surface of planetary module 770 where an engine is located in the active position. Upper jet engine 764a is mounted with a seal 782 that seals against an opposing seal 784 when upper jet engine 764a is in the active position so that the interior of planetary module 760 may be pressurized. Upper rocket engine 766a is mounted with a seal 786 that similarly seals against opposing seal 784 when upper rocket engine 766a is in the active position. An air intake gate seal 788 is provided to seal the air intake in engine cover-rudder 780 as needed (e.g. when there is no engine in the active position as shown). An engine spindle jig 790 and spindle slide structure 792 are components of engine swapping mechanism 762a that facilitate rotational and vertical movement of the upper rocket engine 766a and upper jet engine 764a. A variable pitch mechanism 794 is coupled to upper rocket engine 766a to facilitate angling of upper rocket engine 766a when in the active position (shown in FIG. 7G). A rocket nozzle extension 796 is provided to extend the rocket nozzle as desired when in the active position (e.g. to expel hot exhaust gasses away from the fuselage of the aircraft to avoid heat-related damage).

FIG. 7D shows planetary module 760 with upper jet engine 764a moved up to an active position and lower jet engine 764b moved down to an active position. In the active positions, upper jet engine 764a and lower jet engine 764b align with air intake openings and exhaust openings so that they can operate in air. Upper rocket engine 766a and lower rocket engine 766b remain in their inactive positions within planetary module 770.

FIG. 7E shows planetary module 760 with both jet engines 764a-b and rocket engines 766a-b in inactive positions. The locations are swapped compared with FIG. 7C, with upper rocket engine 766a in the upper inactive position closer to the active position and lower rocket engine 766b closer to the active position.

FIG. 7F shows planetary module 760 with upper rocket engine 766a and lower rocket engine 766b in active positions where their exhaust nozzles direct exhaust gas out of planetary module 760 to propel the aircraft.

FIG. 7G shows an alternative arrangement for rocket engines 766a-b (which do not require an air intake) in planetary module 760. In this view rocket engines 766a-b tilt outwards so that their exhaust gasses are directed out of planetary module 760 while nose sections remain inside planetary module 760. Angling of rocket engines in this manner may facilitate stability of an aircraft, e.g. upper rocket engine 766a and lower rocket engine 766b may be controlled to maintain a stable orientation, for example during reentry.

Figure 8:
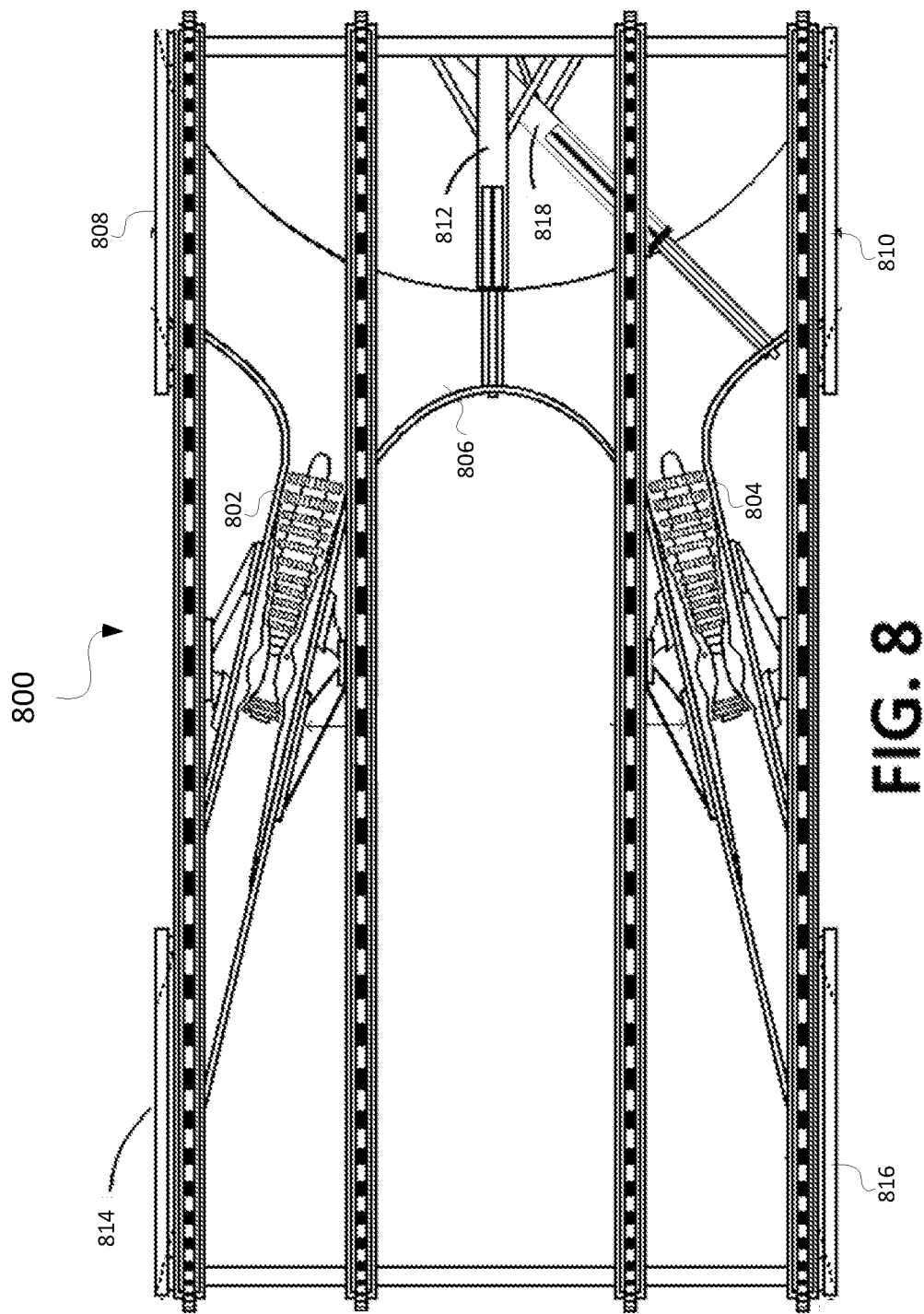
FIG. 8 an example of a planetary module with two jet engines sharing an intake manifold.

FIG. 8 shows another example of a planetary module 800 including two jet engines 802, 804. In this example, jet engines 802, 804 share an air intake manifold 806, which has two air intakes, an upper air intake 808 and a lower air intake 810 (both of which are flush in this arrangement). Shared air intake manifold 806 is configurable so that air can be drawn from above, below, or both above and below. A gate valve 812 is provided that can divide the air intake manifold 806 in two. In this situation, the upper jet engine 802 draws air from an upper intake 808 and the lower jet engine 804 draws air from lower intake opening 810. The upper jet engine 802 expels exhaust gasses outward through upper exhaust opening 814 and the lower jet engine 804 expels exhaust gasses outward through lower exhaust opening 816. In some cases, both upper jet engine 802 and lower jet engine 804 may draw air through the same opening. A gate valve 818 is provided to close off lower air intake 810 so that both upper jet engine 802 and lower jet engine 804 draw air through the shared air intake manifold 806 from the upper air intake 808. For example, when an aircraft containing planetary module 800 is on, or close to the ground (e.g. during take-off and/or landing) gate valve 818 may be closed in order to avoid sucking in debris from the ground and to avoid creating a safety hazard if there are people nearby.

Figure 9A:
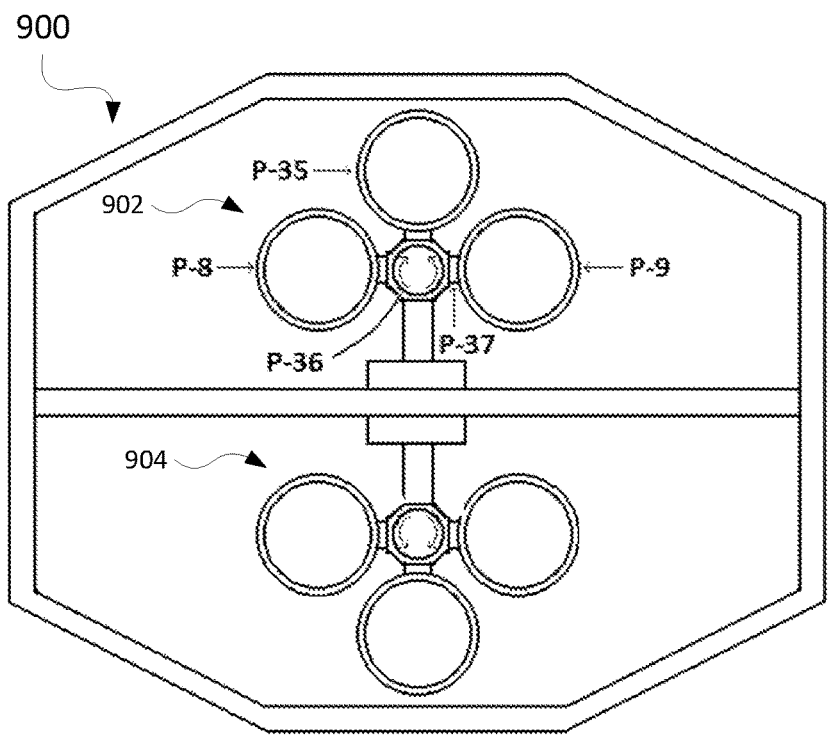

FIG. 9A shows a cross sectional view of a planetary module 900 with an engine swapping mechanism 902 that is configured to swap a jet engine p-8 and a rocket engine p-9 between an active position and one or more inactive positions. An axis of rotation p-36 extends parallel to the jet engine p-8 and the rocket engine p-9 (i.e. perpendicular to the cross section shown) and allows engines to rotate using arms p-37 so that one of the engines is aligned with the exhaust duct p-35 and may be considered in an active position. The active position may also align with an air intake so that a jet engine is aligned with both air intake and exhaust outlets (while the rocket engine may not require an air intake, the active position may align the rocket engine similarly to the jet engine so that a rocket engine lies between air intake and exhaust openings in the active position.) When in an inactive position, an engine is not aligned with an exhaust opening (or air intake opening) and is not functional. This position may be sufficiently removed from the active position to allow maintenance while the engine in the active position is in operation. For example, both jet engine p-8 and rocket engine p-9 are in inactive positions in FIG. 9A. A second engine swapping mechanism 904 is shown in the lower half of planetary module 900. Engine swapping mechanism 904 may be a mirror image of engine swapping mechanism 902, and is configured to couple engines between intake and outlet openings on a lower surface of planetary module 900.

Figure 9B:
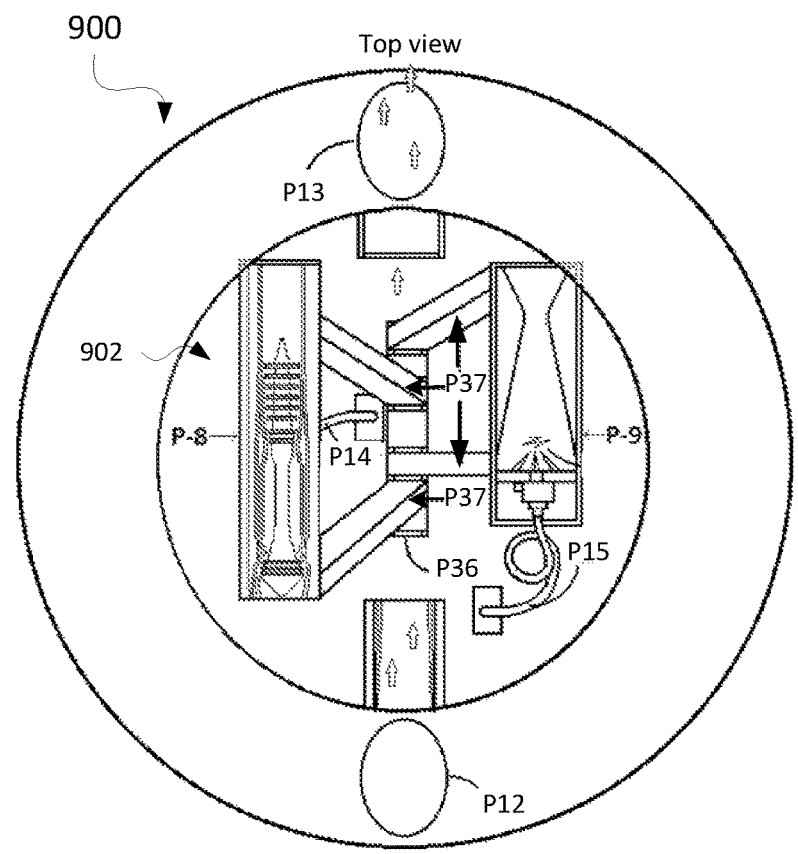

FIG. 9B shows a top view of planetary module 900 and engine swapping mechanism 902. Jet engine p-8 and rocket engine p-9 are mounted on arms p37 so that they are rotatable about central axis p36. Either one may be put in an active position where it is aligned with exhaust p-35. Flexible fuel lines p14 and p15 are provided to supply fuel to jet engine p-8 and rocket engine p-9 respectively. Air intake opening p12 and exhaust opening p13 extend through an upper surface of planetary module 900 (it will be understood that FIG. 9B shows a cut-away view and that a top surface generally extends over engine swapping mechanism 902 leaving only openings p12 and p13 extending into the interior of planetary module 900).

Figure 9C:
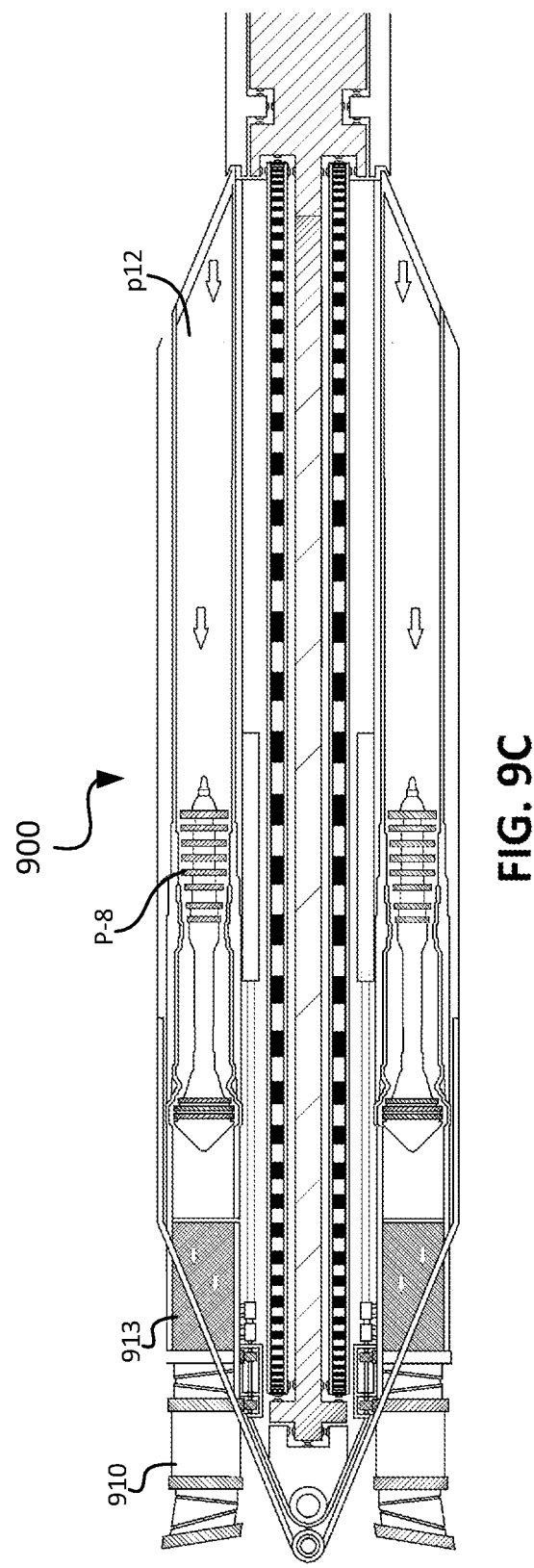

FIG. 9C shows a vertical cross section of planetary module 900 with jet engines in active positions. For example, upper jet engine p-8 is in the active position so that it can receive air from air intake opening p12 and expel exhaust gas through exhaust opening p13. It can be seen that planetary module 900 is contoured to allow thrust to be generated in a substantially horizontal direction. For example, air flows from air intake p12 through jet engine p-8 and out exhaust opening p-13 in a straight line (arrows indicate air flow through jet engines). An exhaust nozzle 910 is provided at exhaust opening p13 to direct exhaust gasses and provide further control of thrust.

FIG. 9D shows another cross section of planetary module 900 along a plane that is at 90 degrees to the plane of FIG. 9C. This view looks directly into intake opening p12 and shows a fin 950 that runs along the direction of the jet from intake opening p12 to exhaust nozzle 910 and that covers an engine in the active position (fin 950 may be considered an engine cover-rudder because it combines the function of covering the engine and acting as a rudder). Fin 950 may be used instead of fins on a fuselage (e.g. instead of fins 104a-d of FIG. 1A). A similar fin 952 extends along the underside of planetary module 900.

FIG. 9E shows an alternative embodiment with a low-profile planetary module 990 that also includes top and bottom fins 992, 994 respectively, which extend along upper and lower surfaces of planetary module 990. Fins 992, 994 cover engines and act as rudders and may be considered engine cover-rudders. Fins 992, 994 may be used instead of fins on a fuselage (e.g. instead of fins 104a-d of FIG. 1A).

While various examples of aircraft with circular symmetry are illustrated here, it will be understood that planetary modules may be used in a range of aircraft that includes aircraft that may not be circularly symmetric. FIG. 10A shows an example of an aircraft 1000 that has a circular central portion 1004 and has planetary modules 1002a-d mounted outside the central portion in an outer portion 1006 that is not circularly symmetric. Aircraft 1000 may produce lift when it moves laterally in any direction so that the advantages of rotatable planetary modules are substantially as discussed above even though aircraft 1000 is not substantially symmetric. For example, circular central portion 1004 may have a profile that creates lift when it travels laterally through the air and/or outer portion 1006 may have a profile that creates lift when it travels laterally through the air.

FIG. 10B shows a view of aircraft 1000 without the outer surface of aircraft 1000 to show the planetary modules 1002a-d mounted with rings of electromagnetic elements as parts of an electromagnetic suspension system that allow planetary modules 1002a-d to be rotated as needed.

Figure 11:
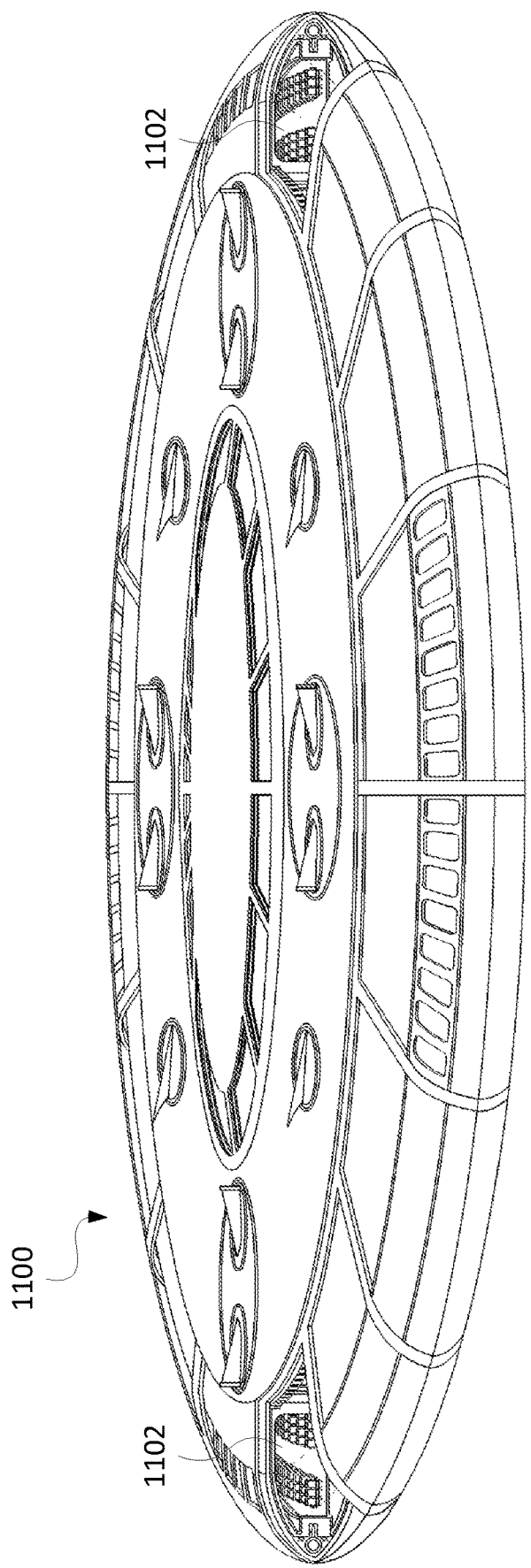
FIG. 11 shows an example of an aircraft with a passenger cabin.

FIG. 11 shows an example of an aircraft 1100 with circular symmetry that is configured for carrying passengers. FIG. 11 includes cutaway sections that show a passenger cabin 1102 that extends in a ring-shaped outer portion of aircraft 1100, with planetary modules and other aircraft systems in an inner portion of the aircraft. In this ring configuration, the passenger cabin 1102 has views out of the aircraft that are unobstructed by wings or engines and the engines are all within a relatively compact portion of the aircraft so that fuel lines, electrical lines, and other conduits are short, and thus infrastructure may be efficiently provided. A ring configuration allows passengers to get up and walk around easily and facilitates delivery of food and beverages to passengers. An automated delivery system may be provided to deliver items from a central location to passengers seated in such a passenger cabin.

Figure 12:
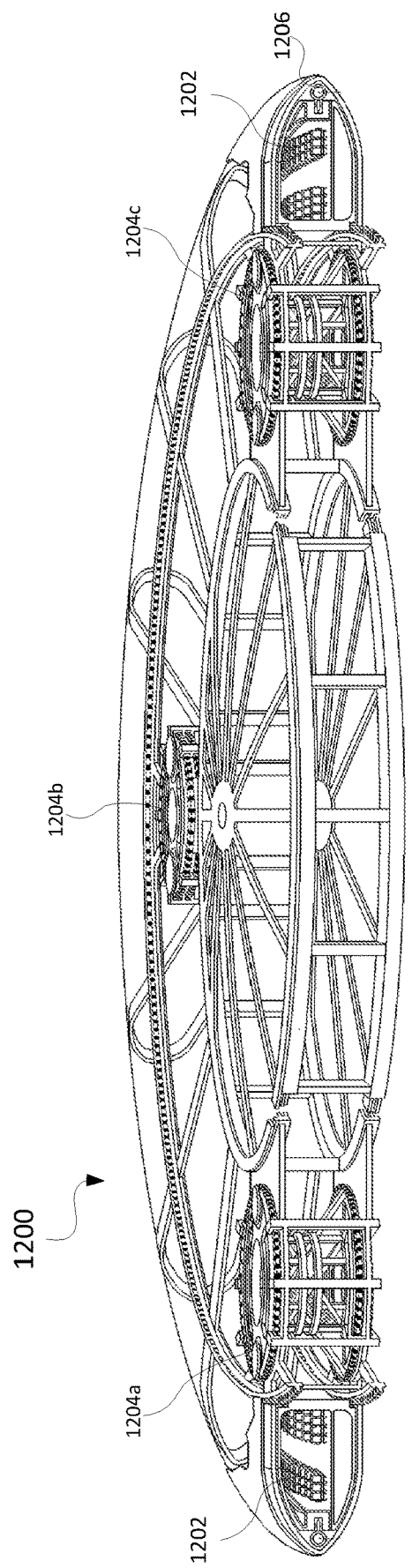
FIG. 12 shows an example of an aircraft with a passenger cabin in cross section.

FIG. 12 shows a passenger aircraft 1200 in cross section including the passenger cabin 1202 extending around a central portion of the aircraft that contains the planetary modules 1204a-c, which are illustrated in cutaway view to clearly show how planetary modules 1204a-c are mounted. In some embodiments, a central portion and an outer ring containing a passenger cabin may rotate relative to each other and may be coupled by an electromagnetic suspension system. FIG. 12 also shows a gyroscopic system 1206, in this example, extending around passenger cabin 1202 to provide stability. For example, a spinning magnetic ring may be spun at high speed in gyroscopic system 1206 to stabilize aircraft 1200.

Figure 13:
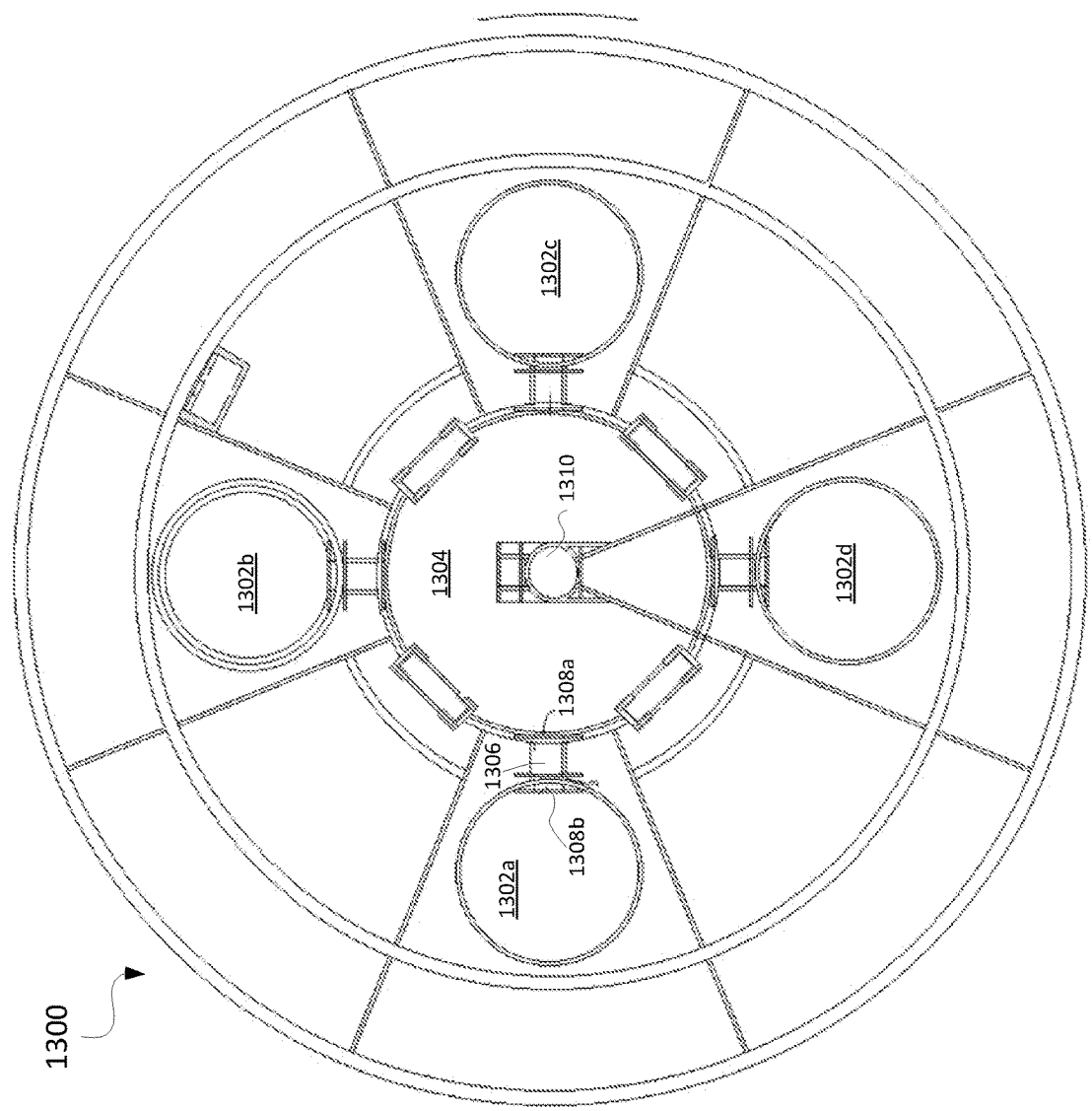
FIG. 13 shows an example of an aircraft with access to planetary modules.

FIG. 13 shows a cutaway view of a circularly symmetric aircraft 1300 that includes planetary modules 1302a-d and a central maintenance area 1304. Central maintenance area 1304 provides access to planetary modules 1302a-d through corresponding airlocks formed by pairs of doors. For example, planetary module 1302a is connected to central maintenance area 1304 through an airlock 1306 that is formed by doors 1308a-b. A central elevator 1310 is provided to access different levels within central maintenance area 1304 and may lead to a bridge deck located at the highest level of central elevator 1310. Central maintenance area 1304 may be maintained at atmospheric pressure so that crew can work there even when aircraft 1300 is at high altitude, or is in space. Other portions of aircraft 1300 may not be at atmospheric pressure. In some cases, planetary modules may be pressurized during operation. In other cases, planetary modules are not pressurized during operation but may be pressurized to allow maintenance. Airlocks may allow crew members to access planetary modules regardless of conditions (e.g. crew members may put on space suits and enter planetary modules that are not pressurized via airlocks).

Figure 14:
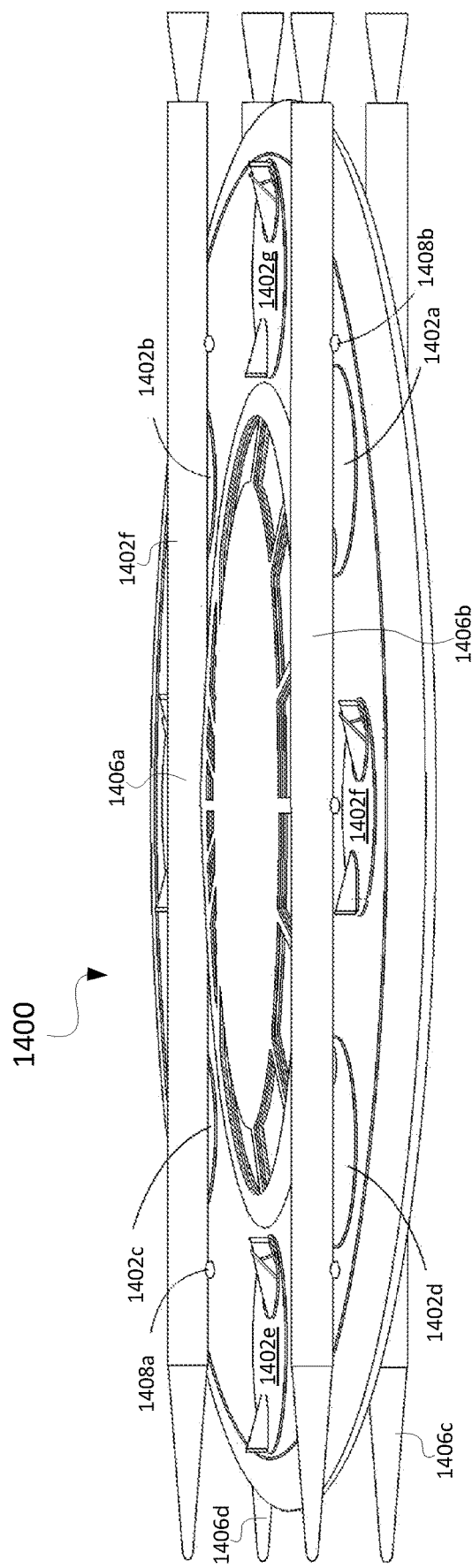
FIG. 14 shows an example of an aircraft with booster rockets.

FIG. 14 illustrates an example of an aircraft 1400 that includes planetary modules 1402a-g as in previous examples (e.g. containing jet engines and/or rocket engines). In addition, aircraft 1400 includes booster rockets 1406a-d to provide additional thrust to get off the ground and get into space, or near space. Booster rockets 1406a-d may be solid-fuel rockets or other one-time use rockets. Alternatively, booster rockets 1406a-d may be reusable. Booster rockets are detachable from aircraft 1400 so that they may be detached when they are depleted. Attachments 1408a-b may be latches that can unlatch to allow booster rockets 1406a-b respectively to fall away from aircraft 1400 (booster rockets 1406c-d are only partially visible in FIG. 14 so that corresponding attachments are not visible).

Figure 15:
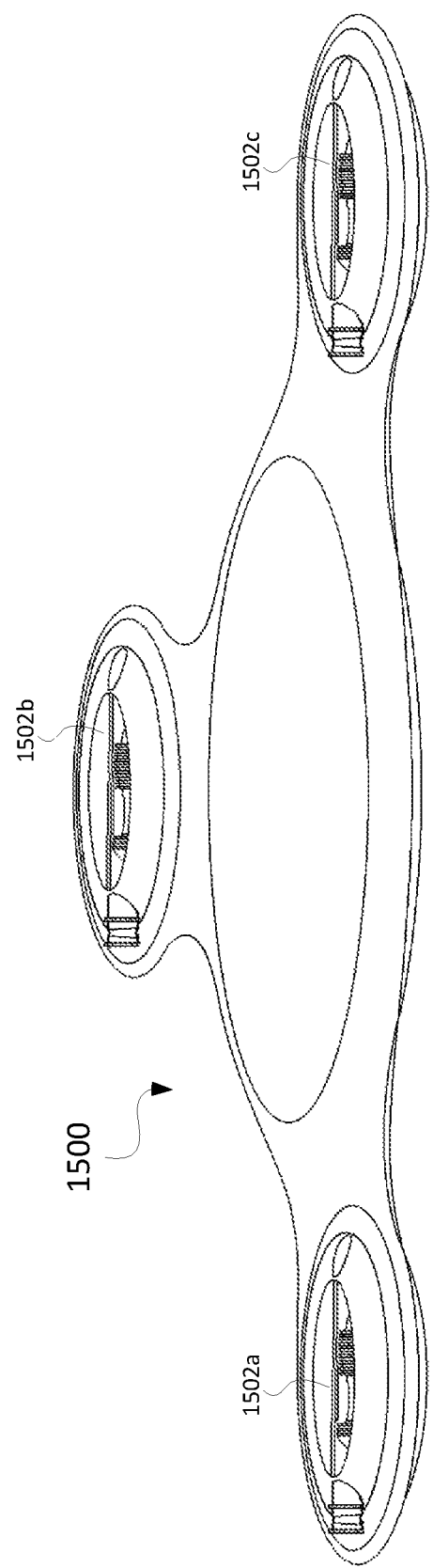
FIG. 15 shows an example of an aircraft with three planetary modules.

FIG. 15 shows an example of an aircraft 1500 that includes three planetary modules 1502a-c instead of four, or eight planetary modules as shown in prior examples. It will be understood that the number of planetary modules is not limited to any particular example shown here and that aspects of the present technology may be implemented with any suitable number of planetary modules. Other aspects shown in drawings here are also non-limiting and are provided for illustration.

Note that the discussion above introduces many different features and many embodiments. It is to be understood that the above-described embodiments are not all mutually exclusive. That is, the features described above (even when described separately) can be combined in one or multiple embodiments.

For purposes of this document, it should be noted that the dimensions of the various features depicted in the FIGS. may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:
1. An aircraft comprising:
a fuselage having an upper surface and a lower surface, the fuselage being substantially circularly symmetric about a vertical central axis; and
a plurality of planetary modules housed in the fuselage, each planetary module having a first jet engine directed outward of the upper surface of the fuselage and a second jet engine directed outward of the lower surface of the fuselage, each planetary module rotatable within the fuselage about an axis that is parallel to the central axis to orient the first and second jet engines of each planetary module.

2. The aircraft of claim 1 wherein each planetary module includes a sealed interior volume that maintains an internal pressure that is a higher pressure than an ambient pressure, the first and second jet engines extending through the sealed interior volume, the first and second jet engines generating thrust within each planetary module.

3. The aircraft of claim 1 further comprising a first rocket engine and a second rocket engine in each planetary module.

4. The aircraft of claim 3 further comprising:
a first engine swapping mechanism configured to swap the first jet engine and the first rocket engine such that the first rocket engine is directed outward of the upper surface of the fuselage; and
a second engine swapping mechanism configured to swap the second jet engine and the second rocket engine such that the second rocket engine is directed outward of the upper surface of the fuselage.

5. The aircraft of claim 4 wherein the engine swapping mechanism comprises an axis of rotation, the first rocket engine and the first jet engine being rotatable about the axis of rotation between an active position and an inactive position.

6. The aircraft of claim 1 wherein each planetary module is mounted within the fuselage by a rotational support and placement system that includes an electrodynamic suspension subsystem.

7. The aircraft of claim 1 wherein the fuselage is circular in cross-section along a horizontal plane and wherein a passenger cabin extends around the plurality of planetary modules in a ring configuration.

8. The aircraft of claim 7 further comprising an automated delivery system extending in the passenger cabin to deliver items from a central location.

9. The aircraft of claim 1 wherein the upper surface and the lower surface of the fuselage define an airfoil shape such that horizontal movement of the fuselage through air produces a lift force.

10. The aircraft of claim 9 wherein the airfoil shape is substantially circularly symmetric about the central axis such that the lift force is produced by horizontal movement of the fuselage in any horizontal direction.

11. The aircraft of claim 10 further comprising a gyroscopic system that is circularly symmetric about the central axis.

12. The aircraft of claim 1 further comprising one or more booster rockets attached to the fuselage by detachable couplings.

13. The aircraft of claim 1 wherein each planetary module is configured to generate thrust, an amount and direction of thrust of each module is controllable.

14. The aircraft of claim 13 wherein the direction of thrust of each planetary module is rotatable about the axis of each respective planetary module through 360 degrees.

15. The aircraft of claim 14 wherein the direction of thrust is controllable relative to the vertical central axis.

16. The aircraft of claim 1 wherein each planetary module generates a thrust and an orientation of the planetary modules determines a direction of the thrust of each module, the thrust of each planetary module combining to generate a net thrust of the aircraft.

17. An aircraft comprising:
a fuselage having an upper surface and a lower surface, the fuselage being substantially circularly symmetric about a vertical central axis; and
a plurality of planetary modules housed in the fuselage, each planetary module having a first rocket engine directed outward of the upper surface of the fuselage and a second rocket engine directed outward of the lower surface of the fuselage, each planetary module rotatable within the fuselage about an axis that is parallel to the central axis to orient the first and second rocket engines of each planetary module.

18. The aircraft of claim 17 wherein each planetary module is rotatable through 360 degrees.

19. The aircraft of claim 17 wherein each planetary module generates a thrust and an orientation of the planetary modules determines a direction of the thrust of each module, the thrust of each planetary module combining to generate a net thrust of the aircraft.

* * * * *